United States Patent
Midorikawa et al.

(10) Patent No.: US 6,332,629 B1
(45) Date of Patent: Dec. 25, 2001

(54) SEATBELT DEVICE WITH LOCKING RETRACTOR

(75) Inventors: Yukinori Midorikawa; Katsuyasu Ono; Masuo Matsuki, all of Fujisawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/421,872

(22) Filed: Oct. 21, 1999

(30) Foreign Application Priority Data

Oct. 23, 1998 (JP) .................................................. 10-302088
Jun. 25, 1999 (JP) .................................................. 11-180957
Jul. 1, 1999 (JP) .................................................. 11-188256

(51) Int. Cl.$^7$ ........................ B60R 22/343; B60R 22/415
(52) U.S. Cl. ........................ 280/806; 280/807; 242/390.8
(58) Field of Search .................................. 280/806, 807; 180/268; 242/390.8, 390.9, 390.1

(56) References Cited

U.S. PATENT DOCUMENTS

| | | | |
|---|---|---|---|
| 4,478,433 | * 10/1984 | Taguchi et al. | 280/807 |
| 4,511,097 | 4/1985 | Tsuge et al. | |
| 4,553,625 | 11/1985 | Tsuge et al. | |
| 4,655,312 | * 4/1987 | Frantom et al. | 280/807 |
| 5,552,986 | 9/1996 | Omura et al. | |
| 5,718,451 | 2/1998 | White. | |
| 5,765,774 | * 6/1998 | Maekawa et al. | 280/807 |
| 5,788,281 | 8/1998 | Yanagi et al. | |

FOREIGN PATENT DOCUMENTS

| | | |
|---|---|---|
| 6-71333 | 10/1994 | (JP) . |
| 09272401 | 10/1997 | (JP) . |
| 10167002 | 6/1998 | (JP) . |
| 10167003 | 6/1998 | (JP) . |
| 10167005 | 6/1998 | (JP) . |
| 10167006 | 6/1998 | (JP) . |
| 10167007 | 6/1998 | (JP) . |
| WO 96/30235 | 10/1996 | (WO) . |

\* cited by examiner

*Primary Examiner*—Peter English
(74) *Attorney, Agent, or Firm*—Crowell & Moring LLP

(57) ABSTRACT

Provided is a seatbelt device capable of realizing a comfortable seatbelt-wearing environment as well as appropriately securing and protecting a passenger. The seatbelt device is further capable of realizing an immediate escape or rescue of a passenger after a vehicle accident, thereby providing extra safety and a swift escape by protracting the webbing in accordance with the state of the vehicle accident. This seatbelt device is provided with a retractor which uses a motor for retracting and protracting the webbing that secures a passenger to his/her seat, and a controller for rotating the motor and at least retracting the webbing. The controller is capable of altering the protraction mode of the webbing in accordance with the state of the webbing fastened by the passenger.

6 Claims, 23 Drawing Sheets

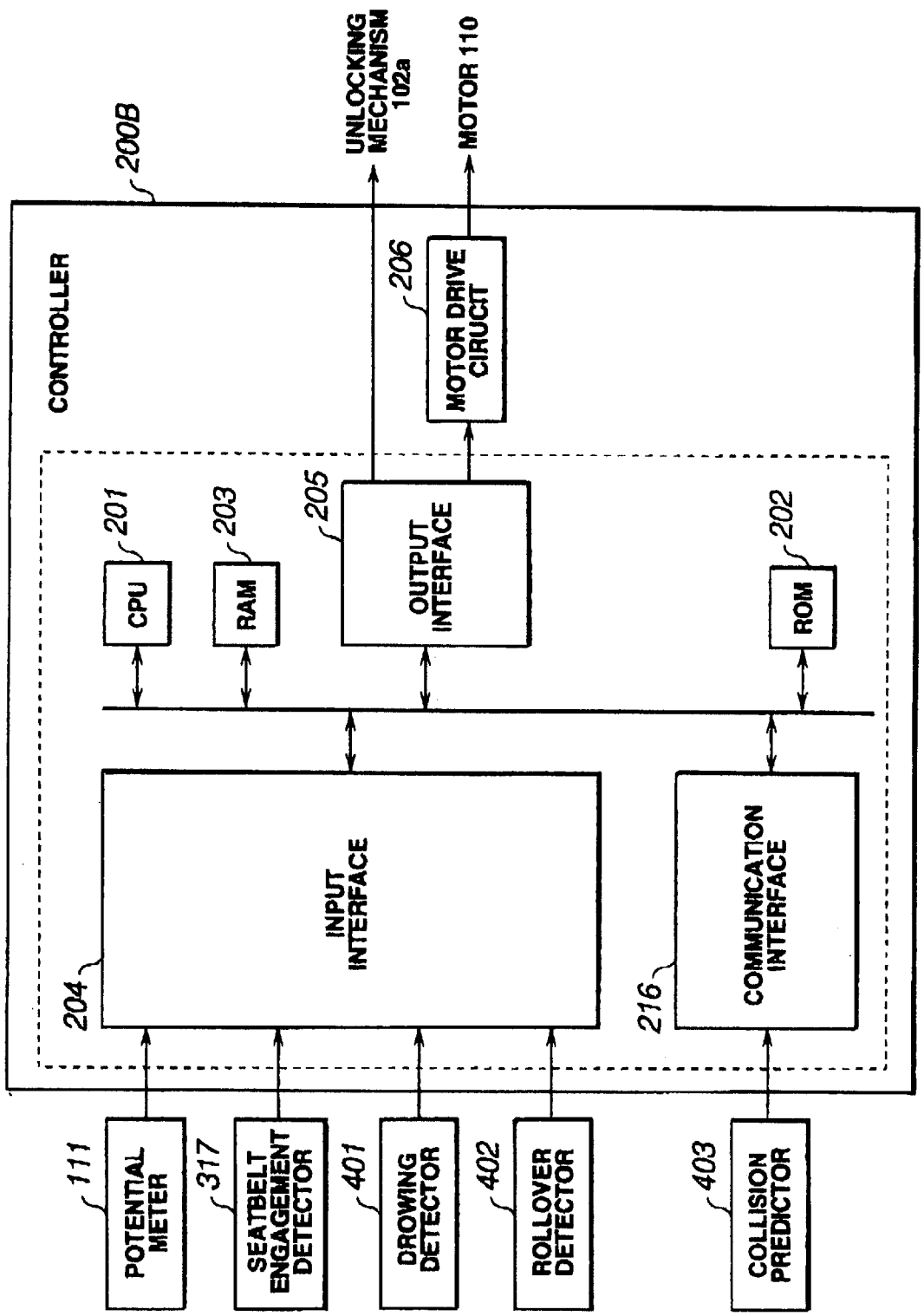

SEATBELT DEVICE WITH LOCKING RETRACTOR

BACKGROUND OF THE INVENTION

1. Field of the Invention

The present invention generally relates to a seatbelt device for securing a passenger to a seat and ensuring the safety of such passenger, and particularly relates to a seatbelt device comprising a retractor for retracting and protracting a webbing with a power source such as a motor.

2. Description of the Related Art

A seatbelt device comprising a retractor for retracting and protracting a webbing has been conventionally known, for example, as described in U.S. Pat. No. 4,511,097. This typical seatbelt device proposes a combination with a motor for protracting and retracting the webbing.

However, if an emergency situation occurs (disconnection within the motor, for example) and a drive current cannot be supplied to the motor of the seatbelt device, no driving force or braking force will be generated, and it is possible that the motor will slip. In such case, after the webbing is fastened, the webbing can be protracted but will not be automatically retracted, and thus, the slack in the webbing is not removed. Driving a vehicle with a slack in the webbing is undesirable as the passenger's security cannot be sufficiently ensured.

The respective controls mentioned above are performed uniformly without consideration to the different uses of the seatbelt by various passengers, and are not necessarily optimum for each passenger. Thus, a typical conventional passenger security/protection device for vehicles could not, in a sufficient manner, provide a comfortable seatbelt-wearing environment or appropriately secure and protect the passenger.

Although a seatbelt is for securing and protecting the passenger upon a vehicle accident, it is also desired that such seatbelt be disengaged immediately after the accident so that the passenger may escape from such vehicle.

Conventionally, when a vehicle accidentally went underwater, the passenger would remove the webbing from the buckle and open the door or window to escape from such vehicle. In this case, the passenger may instantaneously panic, and try to escape without disengaging his/her seatbelt, and the seatbelt device will therefore hinder the passenger's escape. When a vehicle accidentally rolls over, also, the passenger may panic and try to escape without disengaging the seatbelt.

Upon rescuing a passenger from the rolled over vehicle, it is difficult to disengage the buckle of the seatbelt device as it is mounted on the central side of the vehicle interior. Thus, the webbing is often cut in order to rescue the passenger.

Thereby, for example, proposed in Japanese Patent aid-Open Publication No. Sho 59(1984)-40964 is to provide a buckle disengagement device for automatically disengaging the buckle in order to let the passenger free. According to this structure, it is possible to disengage the buckle in emergency situations.

Nevertheless, if the buckle is disengaged due to a misdetection, the passenger must go through the trouble of reconnecting the tongue plate, which the webbing passes through, to the buckle.

SUMMARY OF THE INVENTION

The present invention was devised in order to resolve the aforementioned conventional problems and an object thereof is to provide a passenger security/protection device for vehicles capable of realizing a comfortable seatbelt-wearing environment as well as appropriately securing and protecting a passenger.

Another object of the present invention is to provide a seatbelt device capable of realizing the immediate escape or rescue of the passenger after a vehicle accident.

A further object of the present invention is to provide a seatbelt device capable of realizing extra safety and a swift escape of the passenger by protracting the seatbelt in accordance with the state of the vehicle accident.

In order to achieve the aforementioned objects, the present invention provides a seatbelt device comprising: a retractor which uses a motor for retracting and protracting a webbing that secures a passenger to a seat; and a controller for rotating the motor in order to at least retract the webbing; wherein the controller changes the protraction mode of the webbing in accordance with the state of the webbing fastened by the passenger.

The retractor comprises: a reel to which the webbing is wrapped around; a motor for rotating the reel via a power transmitting mechanism; a rotation detection element for detecting the rotation of the reel; a locking mechanism for locking the rotation of the reel in emergency situations; wherein, when the controller does not detect the rotation of the reel after supplying drive signals to the motor, the controller supplies activation signals to the locking mechanism ordering the activation of the locking mechanism.

When the webbing cannot be retracted with a motor, this structure minimizes the possibility of a passenger wearing a loose webbing (seatbelt) by preventing the protraction of the webbing.

The controller controls the drive of the motor and alters the protraction mode of the webbing based on at least one condition among the slack, tension and retraction power of the webbing, and vibration pattern of the webbing for determining the generation of an alarm.

The controller comprises an alteration element for altering, in accordance with the state of webbing fastened by the passenger, at least one condition among the slack, tension and retraction power of the webbing, and vibration pattern of the webbing for determining the generation of an alarm.

According to this structure, since at least one condition among the slack, tension and retraction power of the webbing, and vibration pattern of the webbing for determining the generation of an alarm is altered in accordance with the state of webbing fastened by the passenger, it is possible to provide a comfortable seatbelt-wearing environment and to appropriately secure and protect the passenger.

Moreover, the seatbelt device according to the present invention may further comprise an adjustment element for adjusting the contents altered by the alteration element.

Even if the contents altered by the alteration element do not suit the passenger, this structure enables the adjustment of such altered contents with the adjustment element. Thus, it is possible to provide an optimum seatbelt-wearing environment for each passenger and to appropriately secure and protect the passenger at all times.

The seatbelt device according to the present invention may further comprise an accident detection element for detecting the state of the vehicle accident, wherein the controller alters the protraction mode of the webbing with a motor in correspondence with the state of accident.

With this structure, it is possible to secure the passenger to his/her seat upon removing the slack in the webbing before the accident, and to loosen the webbing in an appropriate timing in correspondence with the state of the vehicle after the accident. Thus, this is preferable as the passenger's safety and ease of escape are provided.

The locking mechanism may include a mechanical locking mechanism for mechanically locking the rotation of the reel; and at least (a) webbing acceleration sensor for activating the mechanical locking mechanism in correspondence with a sudden protraction of the webbing; or (b) a vehicle acceleration sensor for activating the mechanical locking mechanism upon considerable deceleration.

The webbing acceleration sensor and vehicle acceleration sensor may respectively comprise an electromagnetic actuator for compulsorily activating the mechanical locking mechanism in correspondence with the supply of activation signals.

The controller may be structured so that it does not activate the electromagnetic actuator when the reel is rotating due to the passenger protracting the webbing.

With this structure, it is possible to prevent the hindrance of the protraction of the webbing necessary for fastening the webbing.

The electromagnetic actuator may include: a mechanical urging element for providing a mechanical urge to the actuator in order to activate the webbing acceleration sensor or vehicle acceleration sensor; and an electromagnetic force generating element for generating electromagnetic force which suppresses the mechanical urge; wherein the electromagnetic actuator maintains the electromagnetic force in a stationary state.

Even if the power source to the motor or seatbelt device is cut off due to some problem, this structure activates the mechanical locking mechanism of the reel (i.e., webbing) with the mechanical urging element upon the termination of the electromagnetic force. Thereby, the locking of the webbing is secured even if irregularities occur to the electrical system.

The rotation detection element may be structured from a potential meter connected to the reel.

With this structure, it is possible to learn the rotation quantity from the standard position and estimate the protraction quantity, retraction quantity, rotation quantity of the reel (reel shaft), etc.

The controller is also capable of protracting the seatbelt with the motor after a predetermined time elapses from the detection of the accident.

The accident detection element comprises a drowning detection element for detecting that the vehicle has drowned, and the controller is capable of rotating the motor in the protracting direction in correspondence with the detection of this drowning.

The detection element comprises a rollover detection element for detecting that the vehicle has rolled over, and the controller is capable of rotating the motor in the protracting direction in correspondence with the detection of this rollover after a predetermined time elapses.

The predetermined time may be set to a time required for the abatement of the impact incurred to the rolled over vehicle.

BRIEF DESCRIPTION OF THE DRAWINGS

FIG. 20 is a block diagram explaining the structure of the controller according to the second embodiment;

DETAILED DESCRIPTION OF THE PREFERRED EMBODIMENTS (First Embodiment)

The seatbelt device according to the first embodiment of the present invention is explained with reference to the relevant drawings.

Figure 1:
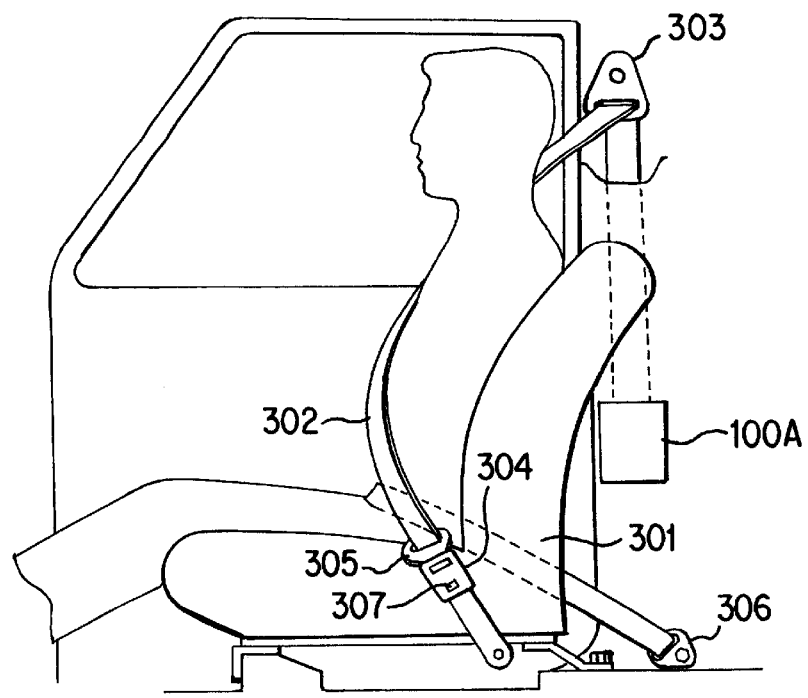
FIG. 1 is a diagram explaining the structure of the seatbelt device according to the first embodiment of the present invention.

FIG. 1 shows the seatbelt device of the first embodiment. The seatbelt device is structured of an electromotive retractor 100A for retracting a webbing 302 which secures the passenger to a seat 301, a through-anchor 303 for folding back the webbing near the passenger's shoulder, a tongue plate 305 to which the webbing passes through and which engages with a buckle 304 arranged at the passenger's abdominal region, an anchor 306 for securing one end of the webbing 302 to the vehicle, a switch 307 built inside the buckle, a controller 200A (explained later, refer to FIG. 2), etc.

Figure 2:
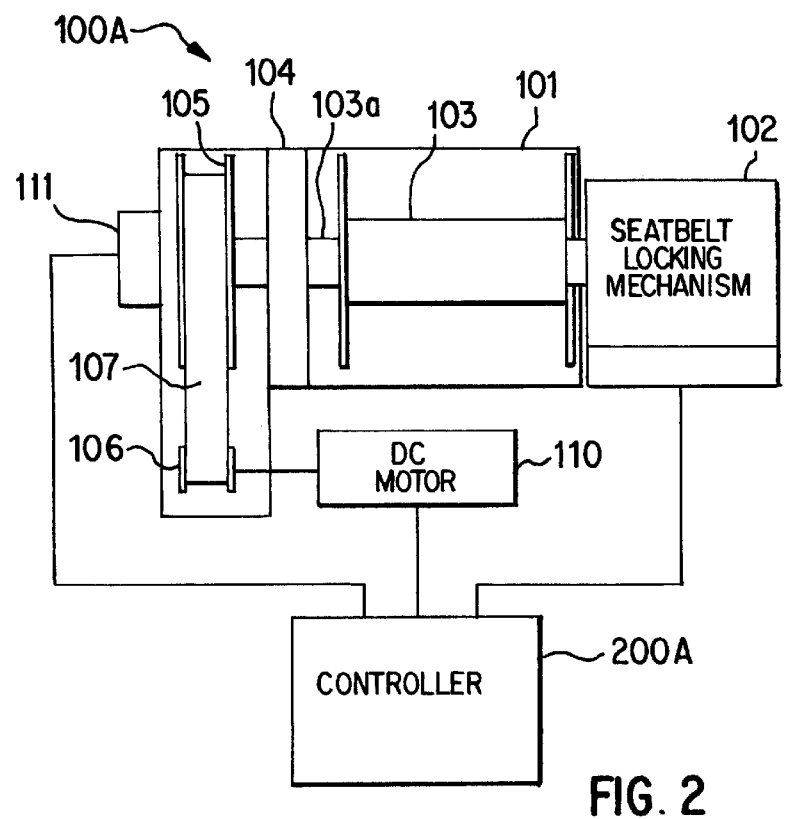
FIG. 2 is a diagram explaining the structure of the retractor according to the first embodiment.

FIG. 2 is a diagram explaining the outline of the structure of the retractor 100A. In FIG. 2, the retractor 100A comprises a frame 101. Rotatably provided to this frame 101 are a reel 103 for winding the webbing 302 (refer to FIG. 1) and a reel shaft 103a which is connected to the reel 103 and is the central axis of the reel rotation.

Secured to the right end of the reel shaft 103a is a seatbelt locking mechanism 102 for locking the webbing when a prescribed deceleration works on a vehicle or when the webbing 302 is protracted at a prescribed acceleration. Further provided to the locking mechanism 102 is an electromagnetic actuator 112 explained later for compulsorily activating such locking mechanism 102. The activation of the electromagnetic actuator 112 is controlled by the output of the controller 200A explained later.

Provided to the left end of the reel shaft 103a are a pretensioner 104, pulley 105, and potential meter 111. The pretensioner 104 activates pursuant to the output of the collision detector not shown, rotates the reel shaft 103a in the retracting direction of the webbing 302, and secures the passenger to the seat by compulsorily retracting the webbing 302. The pretensioner 104 may be, for example, a powder pretensioner, and is structured of a gas generator, a cylinder for sealing the gas generated by this gas generator, a piston which moves within this cylinder by gas pressure, a timing belt (as a power transmitting mechanism) for converting this piston movement into a rotary motion of the reel shaft 103a via the clutch mechanism, etc.

The pulley 105 secured to the reel shaft 103a is connected to a pulley 106 secured to the axis of the direct current (DC) motor 110 via the timing belt 107. A prescribed number of outer gear teeth are formed respectively on the outer periphery of the pulleys 105, 106, and a prescribed number of inner gear teeth are formed on the inner periphery of the belt 107. The respective gear teeth of the pulley 105 of the reel shaft 103a, the pulley 106 of the motor, and the timing belt 107 are engaged with each other in proper quantities, and the rotation of the motor 110 is transmitted to the reel shaft 103a. The motor 110 is secured to the frame 101 in at least two points, and is driven by the output of the controller 200A.

Figure 4:
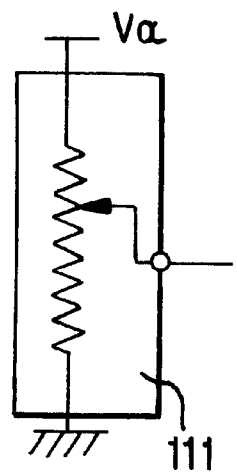
FIG. 4 is a diagram explaining the potential meter according to the first embodiment.

The potential meter 111 provided on the left end of the reel shaft 103a is, as shown in FIG. 4, structured of a resistor for applying voltage to both ends thereof, and a slider which interlocks with the rotation of the reel shaft 103a. This potential meter 111 outputs to the controller 200A a voltage value corresponding to the rotation quantity from the standard position of the reel shaft 103a.

Figure 3:
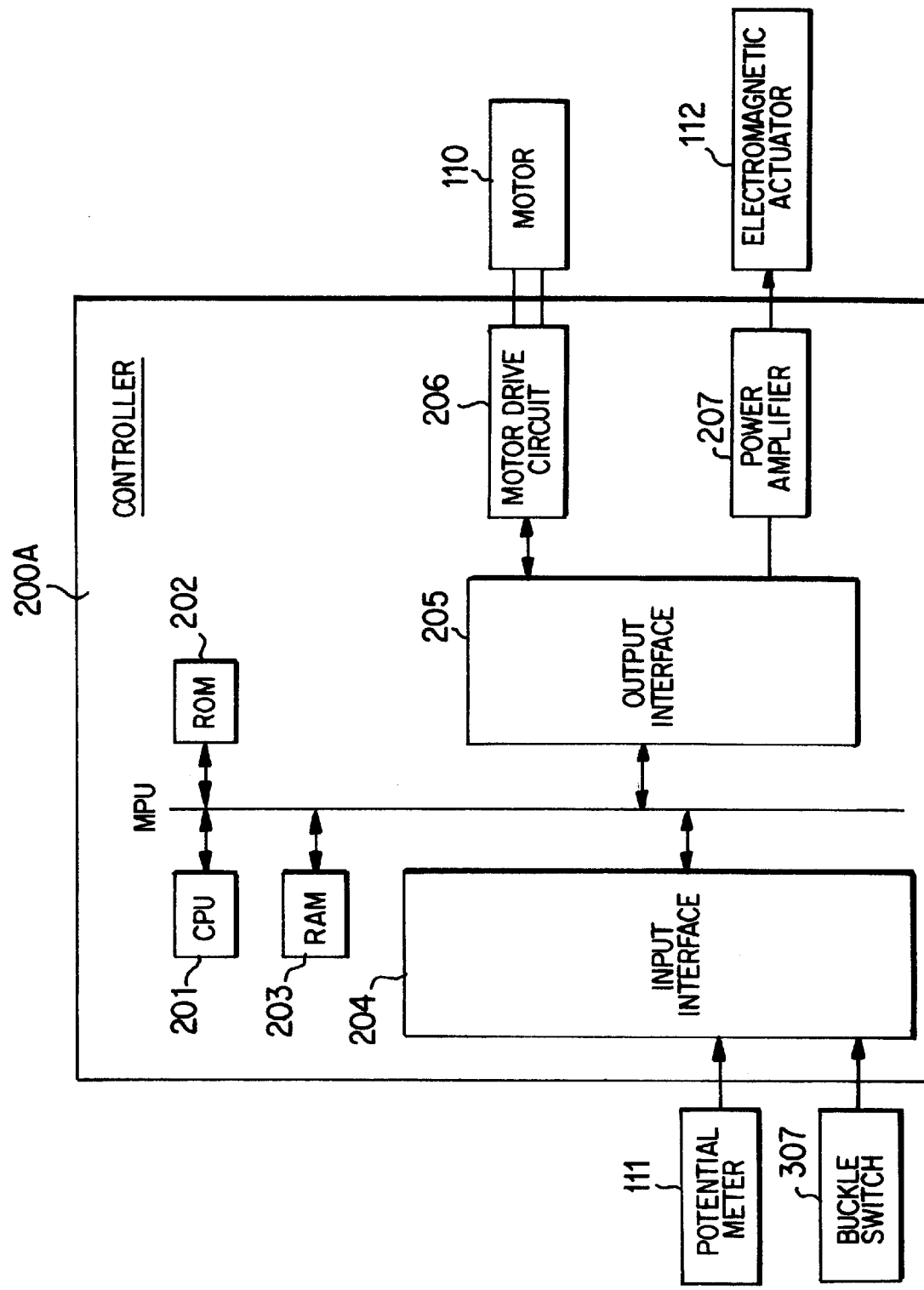
FIG. 3 is a functional block diagram explaining the structure of the controller according to the first embodiment.

FIG. 3 is a functional block diagram explaining the structural outline of the controller 200A. As shown in FIG. 3, the controller 200A is structured of a microcomputer system. The CPU 201 loads control programs and data retained in the ROM 202 to the work area of the RAM 203, and controls the operation of the DC motor 110 and the solenoid as the electromagnetic actuator 112. The output voltage of the aforementioned potential meter 111 is A/D converted in prescribed cycles by the input interface 204.

The input interface 204 has a CPU built therein, and monitors the converted output voltage data. For example, with the difference between the present and previous output voltage data, it judges the rotational state of the reel shaft 103a and sets a "shaft rotating" flag to the flag area of the RAM 203. With the difference between the present and previous output voltage value being positive or negative, the input interface 204 further sets a "protraction" flag or a "retraction" flag of the webbing 302 to the flag area of the RAM 203. Moreover, it writes the output voltage data to the rotation quantity area of the RAM 203 with DMA operation. The input inter-face 204 sets an engagement/disengagement flag of the seatbelt device to the flag area of the RAM 203 upon receiving the open/close output of the buckle switch 307 which is built in the buckle of the seatbelt device and which generates an output in correspondence to the engagement/disengagement of the seatbelt device.

When prescribed conditions set to the control program are fulfilled, the CPU 201 provides to the output interface 205 a normal rotation order, reverse rotation order, or drive suspension order for the DC motor 110.

The output interface 205 generates gate signals G1, G2 in correspondence to these orders and supplies such signals to the motor drive circuit 206. G1 and G2 are set as "H" and "L" in response to a normal rotation order, as "L" and "H" in response to a reverse rotation order, and as "L" and "L" in response to a drive suspension order, respectively.

Figure 5:
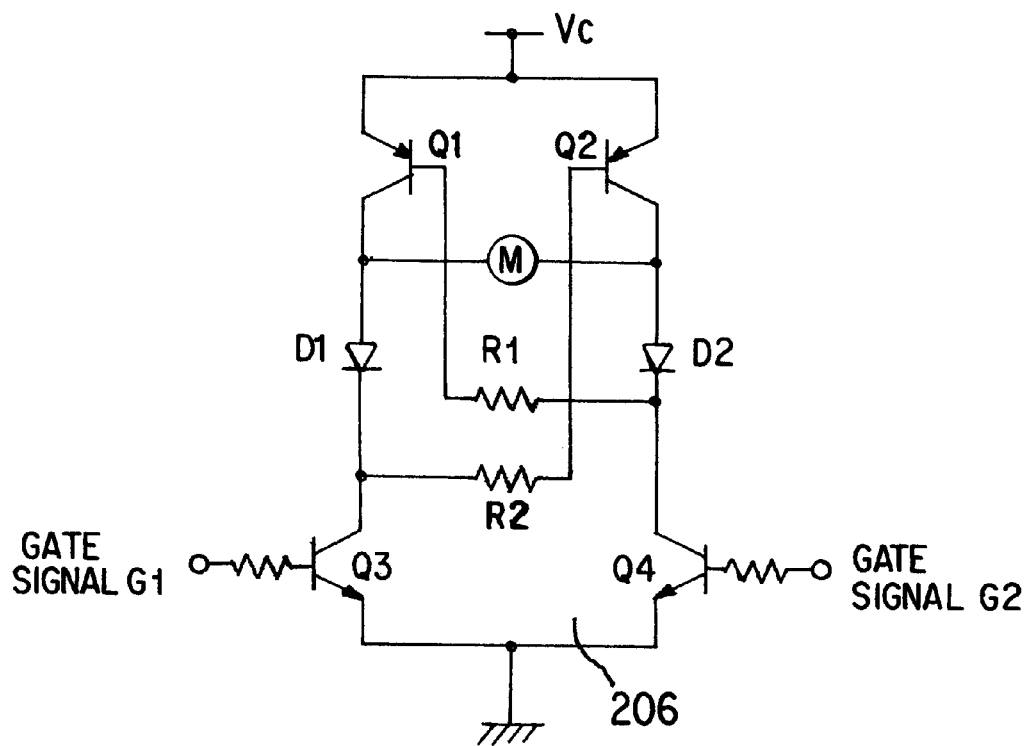
FIG. 5 is a circuit diagram showing a structural example of the drive circuit of the motor according to the first embodiment.

FIG. 5 is circuit diagram showing the structural example of the motor drive circuit 206. A transistor bridge circuit is structured of four transistors, namely, PNP transistors Q1 and Q2, and NPN transistors Q3 and Q4. Emitters of transistors Q1 and Q2 are connected, and a power source Vc is supplied to this connection point. Emitters of transistors Q3 and Q4 are also connected, and a ground is supplied to this connection point. The collector of transistor Q1 and the collector of transistor Q3 are connected via diode D1. The collector of transistor Q2 and the collector of transistor Q4 are connected via diode D2. The base of transistor Q1 and the collector of transistor Q4 are connected via the urge resistance RI. The base of transistor Q2 and the collector of transistor Q3 are connected via the urge resistance R2. A DC motor M is connected mutually between the respective collectors of transistors Q1 and Q2.

In the aforementioned structure, when a normal rotation order signal (G1="H", G2="L") is supplied to the respective gates of transistors Q3 and Q4 from the output interface 205, transistor Q3 becomes conductive and transistor Q4 becomes non-conductive. The collector of transistor Q3 becomes a ground level by conductivity, urges the base of transistor Q2 to a low level (approximate ground level) via resistance R2, and makes transistor Q2 conductive. The collector of transistor Q4 becomes an approximate power source Vc level, urges the base of transistor Q2 to a high level via resistance R1, and makes transistor Q1 non-conductive. As a result thereof, a current path is formed in the orderly direction of the ground path of power source Vc, transistor Q2, motor M, diode D1, and transistor Q3, and the motor M rotates in the direction for retracting the webbing.

When a reverse rotation order signal (G1="L", G2="H") is supplied to the respective gates of transistors Q3 and Q4 from the output interface 205, transistor Q3 becomes non-conductive and transistor Q4 becomes conductive. The collector of transistor Q4 becomes a ground level, urges the base of transistor Q1 to a low level via resistance R1, and makes transistor Q1 conductive. The collector of transistor Q3 becomes an approximate power source Vc level, urges the base of transistor Q2 to a high level via resistance R2, and makes transistor Q2 non-conductive. As a result thereof, a current path is formed in the orderly reverse direction of the ground path of power source Vc, transistor Q1, motor M, diode D2, and transistor Q3, and the motor M rotates in the direction for protracting the webbing.

When a drive suspension order signal (G1="L", G2="L") is supplied to the respective gates of transistors Q3 and Q4 from the output interface 205, the NPN-type transistors Q3 and Q4 both become non-conductive. When transistor Q3 becomes non-conductive from a conductive state, the collector of transistor Q3 rises from a ground level to an approximate power source level, urges the base of transistor Q2 to a high potential, and interrupts transistor Q2 as well. Similarly, when transistor Q4 becomes non-conductive from a conductive state, the collector of transistor Q4 rises from a ground level to an approximate power source level, urges the base of transistor Q1 to a high potential, and interrupts transistor Q1 as well. Accordingly, when a drive suspension order is given, the respective transistors structuring the bridge become non-conductive.

Referring back to FIG. 3, the CPU 201 provides to the output interface 205 an activation order of the solenoid as the actuator 112 when prescribed conditions for preventing the slack in the webbing 302 are fulfilled. The activation order set to the register flag of the output interface 205 is amplified by a power amplifier 207 from a logical level signal to a level capable of activating the solenoid, and then provided to such solenoid. By the operation of this solenoid, the actuator moves, and the locking mechanism explained later of the retractor 100A is activated.

Figure 6:
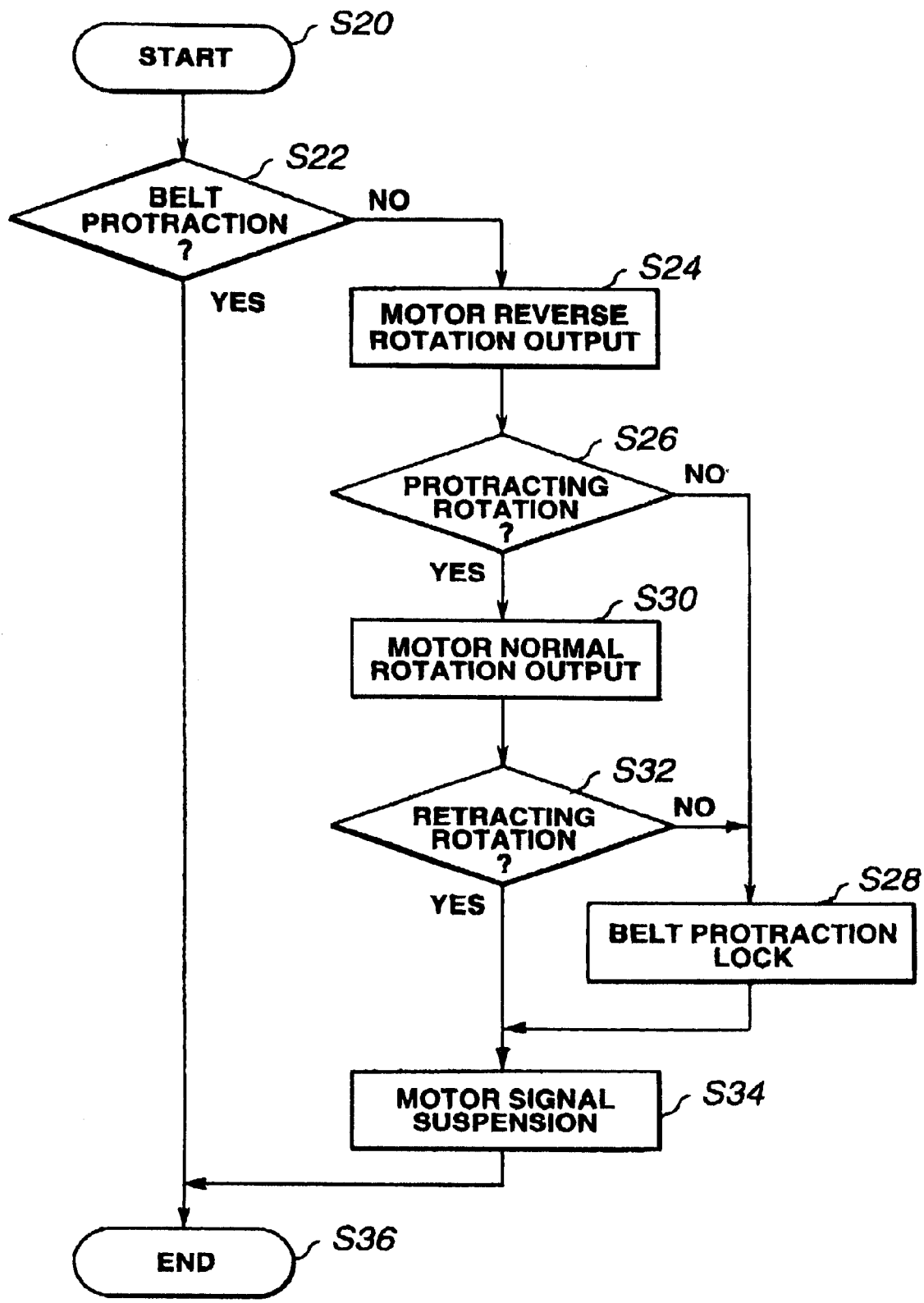
FIG. 6 is a flowchart explaining the operation of the controller according to the first embodiment.

FIG. 6 is a flowchart explaining the operation of the CPU 201 of the controller 200A.

By fulfilling the conditions such as the on state (buckle switch 307 in the closed state) of the seatbelt device fastening flag, the CPU 201 judges in prescribed intervals that the locking of the protraction of the webbing is under a permissible condition, and performs the subroutine (S20).

In a state wherein the DC motor 110 is not driven, the CPU 201 foremost judges the on/off of the "webbing protraction" flag of the flag register (flag area) of the RAM 203. When the "webbing protraction" flag is "on" (S22; YES), the CPU 201 ends the routine without activating the locking mechanism as the webbing is being protracted by the passenger, and returns to the main program (S36). When the protraction of the webbing is not being conducted (S22; NO), the CPU 201 provides a reverse rotation order for the motor to the output interface 205 (S24). The output interface 205 provides a gate signal to the motor drive circuit 206 and, when the DC motor 110 rotates in the protracting direction, the potential meter 111 also rotates in the protracting direction. A protraction flag is set to the flag register by the input interface 204 which monitors the change in the output voltage of the potential meter 111. The CPU 201 confirms (judges) the above (S26). When no protraction flag is set (S26; NO), in other words when the potential meter 111 is not rotating toward the protraction side, a malfunction of the DC motor 110, retractor, and so on may be considered. The CPU 201 activates the solenoid via the output interface 205, prevents the protraction of the webbing 302 by activating the locking mechanism, and prevents the increase of slack in the webbing 302. The CPU 201 then sets a malfunction detection flag to the flag register (S28), suspends the rotation order for the motor 110 (S34), and returns to the main program (S36).

When the protraction flag is set to on (S26; YES), the CPU 201 judges the operation of the protracting direction of the webbing 302 as normal since the potential meter 111 is rotating in correspondence with the rotation order of the DC motor 110. Next, the CPU 201 orders the normal rotation of the motor 110 to the output interface 205. The output interface 205 provides a gate signal to the motor drive circuit 206 (S30).

When the DC motor 110 rotates in the retracting direction, the potential meter ll also rotates in the retracting direction. A retraction flag is set to the flag register by the input interface 204 which monitors the change of output voltage of the potential meter 111. Thereby, it is recognized that the webbing 302 has been retracted in correspondence with a normal rotation order of the DC motor 110 (S32; YES). As the operation is normal, the CPU 201 orders the output interface 205 to suspend the DC motor 110, and the DC motor 110 is thereby suspended (S34). The CPU 201 returns to the main program thereafter (S36).

When the DC motor 110 does not rotate in the retracting direction or if there is some irregularity, the potential meter 111 will not rotate in the retracting direction. The input interface 204 does not set a retraction flag to the flag register as the output voltage of the potential meter 111 does not show a prescribed change. When the CPU 201 judges this, it is determined to be an error (S32; NO). When the DC motor 110 does not activate, the reel shaft 103a may slip and, in order to prevent this, the protraction locking mechanism of the webbing 302 is activated. The CPU 201 operates the solenoid via the output interface 205, prevents the protraction of the webbing 302 by activating the locking mechanism of the webbing 302, and prevents the increase of slack in the webbing 302. The CPU 201 then sets the malfunction detection flag to the flag register (S28), suspends the rotation order of the motor 110 (S34), and returns to the main program (S36).

Like this, when a malfunction occurs in the retractor 100A, it is possible to prevent the slack in the webbing by preventing the reel 103 from slipping.

FIGS. 7 through 18 are exploded perspective views and vertical section views of principle portions explaining mainly the seatbelt locking mechanism (reel mechanical locking mechanism, webbing acceleration sensor, vehicle deceleration sensor) and the electromagnetic actuator 112 of the retractor 100A. Incidentally, a pretensioner is not mounted in the drawing shown in FIG. 7. When necessary due to a special character of the vehicle, as shown in FIG. 2, the pretensioner may be arranged between the retractor base 1 and the timing belt 15 shown in FIG. 7.

Referring to FIGS. 7 through 12, the retractor base 1 has an approximate C-shaped cross section, the opposing side plates 1a, 1b respectively have provided thereto opposing winding shaft through holes, and the reel 3, which is the winding shaft, for retracting the webbing 302 (refer to FIG. 1) passes through the winding shaft through holes and is rotatably provided thereto by the winding shaft.

Inner gear teeth 2 are formed on the inner periphery of the winding shaft through holes provided to the side plate 1a, and a ring 4 is juxtaposed on the exterior of the winding shaft through holes. Drawing is performed on the inner periphery of the ring 4 and, when the ring 4 is secured to the exterior face of the side plate 1a by a rivet 40, a gap in the axial direction between the inner gear teeth 2 and the inner peripheral edge of the ring 4 is formed.

Further, arranged on the side plate 1a of the base 1 is an emergency locking mechanism for preventing the protraction of the webbing 302 during emergency situations. Arranged on the side plate 1b of the base 1 are a pulley 105 connected to the axis 15c (corresponds to reel shaft 103a) driven by the DC motor 110 via the timing belt 107, and a timing belt unit 15 including a potential meter 111 and the like. The reel 3 is a winding shaft having an approximate cylindrical shape and formed integrally with aluminum alloy and the like. A slit opening 28a in the diameter direction for passing the webbing end through and retaining such webbing end is provided to the barrel 28 to which the webbing 302 is wound. A separately formed flange 13 is mounted on the outer periphery of the reel 3, and prevents the winding disorder of the webbing. The position of entrance and exit of the webbing 302 wound on the outer periphery of the reel 3 mounted on the retractor base 1 is restricted by such webbing being passed through the webbing guide 41 mounted on the upper part of the back side of the retractor base 1.

Although a rotation spindle for rotatably supporting the reel 3 is protrusively provided to both ends of the reel 3, a separately formed spindle pin 6 is press fitted to the sensor side end face of the reel 3 as the rotation spindle. Moreover, protrusively provided to the sensor side end face of the reel 3 is a spindle 7 for rotatably supporting a pole 16, which is a locking member, in a rocking manner, capable of being engaged with the inner gear teeth 2 formed on the side plate 1a. Provided to the sensor side end face of the reel 3 is a pressure face 45 which determines the position of the pole back end portion 16e opposite to the rocking side end of the pole 16 when the pole 16 rockingly rotates in the engagement direction with the inner gear teeth 2 and, when a large load is inflicted upon the pole 16 between the inner gear teeth, receives such load.

On the sensor side end face of the reel 3, provided is a stopper protrusion 8 for restricting the counterclockwise rotation of the rocking lever 20 supported in a rocking manner by the ratchet wheel 18, which is the latch member of the lock activation element explained later. The convex portion 9 is a recess element for preventing a pull coil spring 36 which rotationally urges the ratchet wheel 18 in the webbing protracting direction (direction of arrow X2 in FIG. 8) and the arm 26c of the lock arm 26 which presses the sensor spring 25 explained later, from interfering with the reel 3.

To the rocking end of the pole 16, formed integrally are gear teeth 16c capable of engaging with and in correspondence to the inner gear teeth 2 structured on the side plate 1a. A shaft hole 16a to which the spindle 7 loosely engages is provided at the central portion of the pole 16. Provided to the sensor side face of the pole 16 are an engagement protrusion 16b positioned at the rocking end side and a pressure protrusion 16d positioned at the pole rear end portion 16e.

That is to say, as the spindle 7 is loosely engaged with the shaft hole 16a, the spindle 7 supports the pole 16 in a rockingly rotatable manner and enables a prescribed relative displacement. The tip of the spindle 7 passing through the shaft hole 16a of the pole is caulked to a stopper hole 17b of the retaining plate 17, which is engaged with a spindle pin 6 pressed into the reel 3 by such pin passing through the perforation hole 17a. Thus, the retaining plate 17 prevents the pole 16 from rising from the end face of the reel 3.

The end of the engagement protrusion 16b of the pole 16 is inserted into a cam hole 18a formed on the ratchet wheel 18, which is arranged on the exterior of the retaining plate 17 and rotatably supported by spindle pin 6. Thus, when the ratchet wheel 18 relatively rotates toward the webbing retracting direction (direction of arrow X1 in FIG. 8) in relation to the reel 3, the cam hole 18a works to move the tip of the engagement protrusion 16b outward toward the radius direction from the rotational central axis of the reel 3. Thereby, the pole 16 rockingly rotates around the spindle 7 in the engagement direction (direction of arrow Y1 in FIG. 7) with the inner gear teeth 2 structured on the side plate 1a.

In other words, by the pole 16 rockingly rotating toward the engagement direction with the inner gear teeth 2 and the engagement teeth 16c of the pole 16 engaging with the inner gear teeth 2, structured is the locking element for preventing the rotation of the reel 3 in the protracting direction of the webbing. The ratchet wheel 18 is a ratchet with its central hole rotatably supported by the spindle pin 6, and ratchet teeth 18b for engaging with the sensor arm 53 of the vehicle acceleration sensor 51 are formed on the outer periphery thereof. The flange 6a of the spindle pin 6 supports the central hole 30a of the inertia plate 30, which is a discoid inertial member for structuring the webbing acceleration sensor, which is an inertia sensor for sensing the acceleration of the protraction of the webbing 302. The stopper pawl 23 protrusively provided toward the exterior of the retractor at the peripheral edge of the central hole of the ratchet wheel 18 determines the position of the thrust direction of the inertia plate 30 by engaging with the engagement hole 30b. An engagement protrusion 31 of the inertia plate 30 is engaged with the long hole 24 formed in the ratchet wheel 18. One edge 24a of the long hole 24 determines the position of the rotating direction of the inertia plate 30 upon the inactivation of the emergency locking mechanism (refer to FIG. 10).

Figure 10:
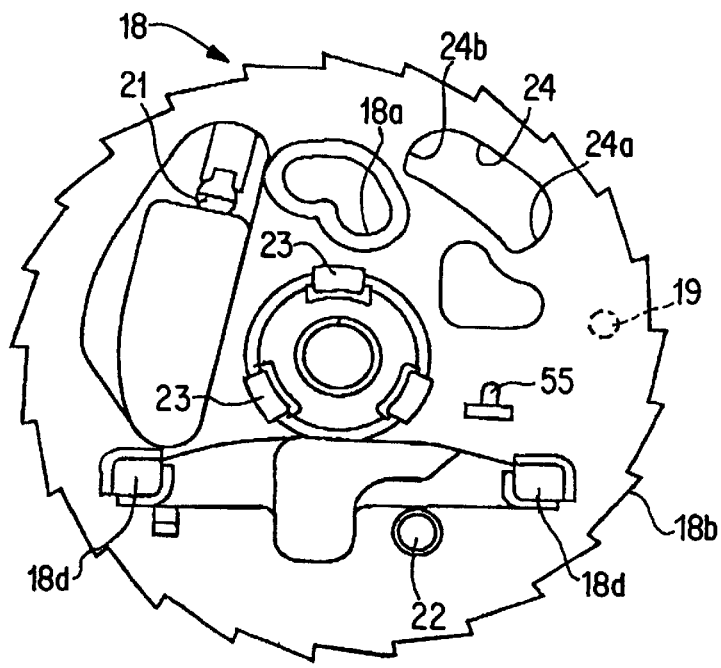
FIG. 10 is a diagram explaining the activation of the locking mechanism caused by a rapid protraction of the webbing (webbing acceleration) according to the first embodiment.
Figure 12:
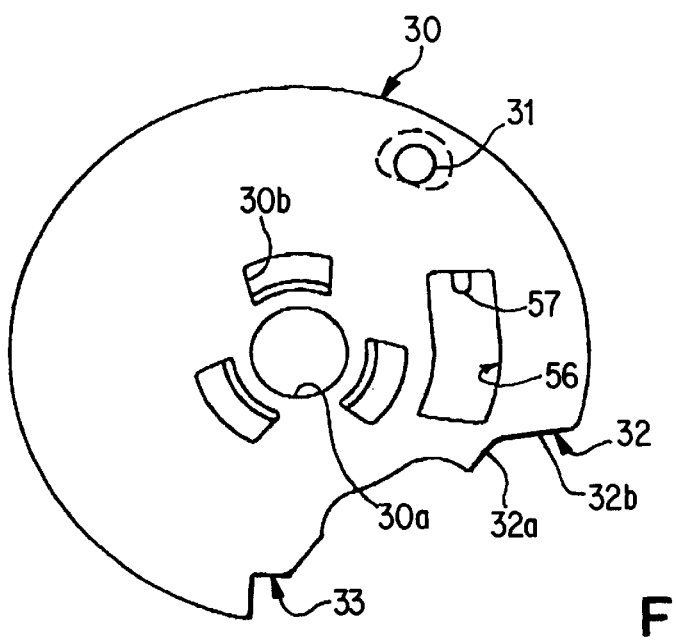
FIG. 12 is a diagram explaining the inertia plate according to the first embodiment.

As shown in FIG. 10, a shaft 22 for rotatably supporting the lock arm 26 and a spring hook 55 are protrusively provided on the exterior face of the ratchet wheel 18. And as shown in FIG. 12, an opening 56 for inserting the spring hook 55 is provided to the inertia plate 30. This opening 56 is formed in a shape of a long hole such that the inertia plate 30 is able to relatively rotate in relation to the ratchet wheel 18 while the spring hook 55 is inserted therein. On the other end thereof, provided is a spring hook 57 in correspondence with the spring hook 55.

Figure 13:
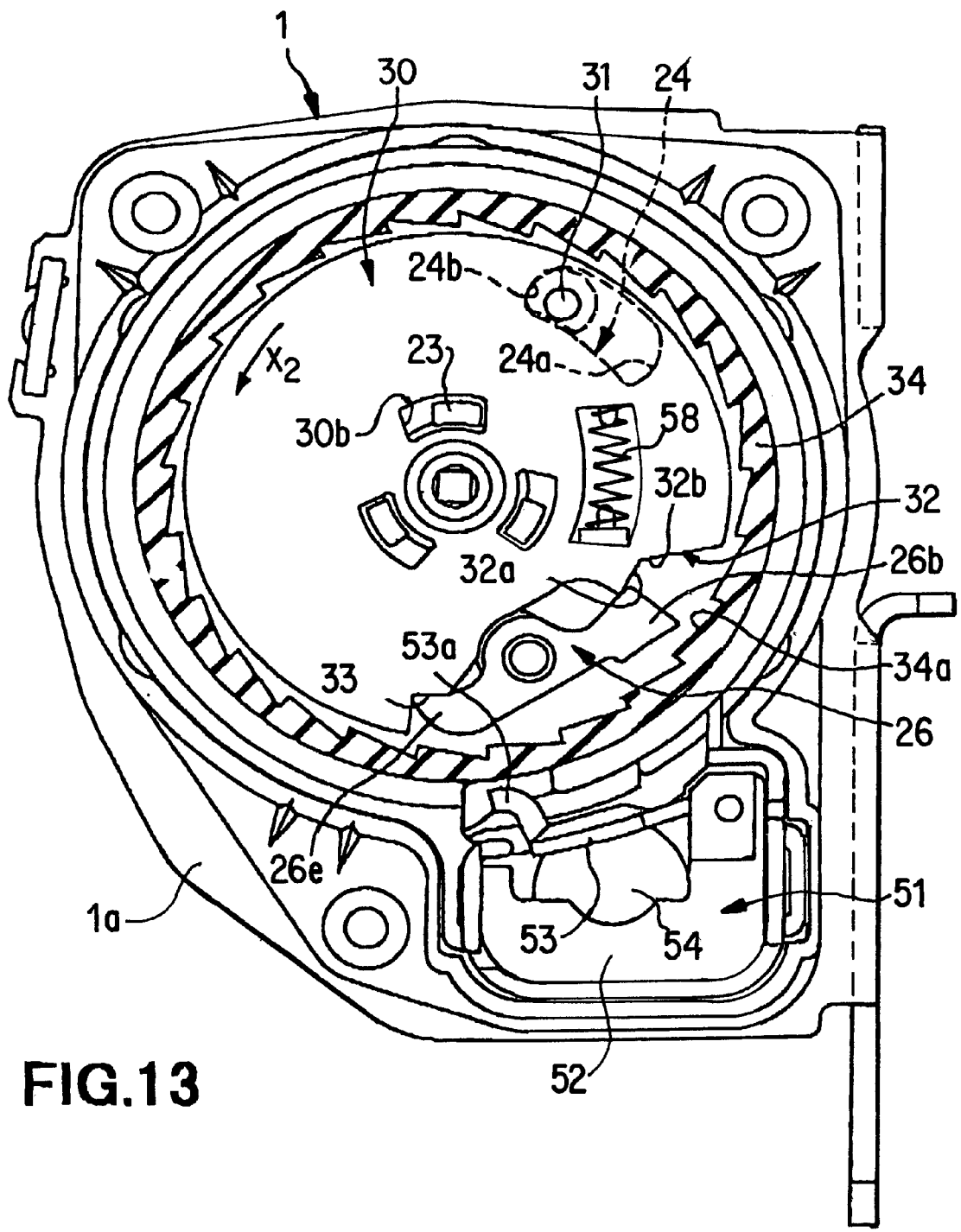
FIG. 13 is a diagram explaining the activation of the locking mechanism caused by the webbing acceleration according to the first embodiment.

A compression coil spring 58 is engaged and inserted between this pair of spring hooks 55, 57. As shown in FIG. 13, this compression coil spring 58 is urged such that the engagement protrusion 31 on the inertia plate 30 maintains contact (i.e., unlocked state) with the other end 24b of the long hole 24 formed in the ratchet wheel 18.

Figure 11:
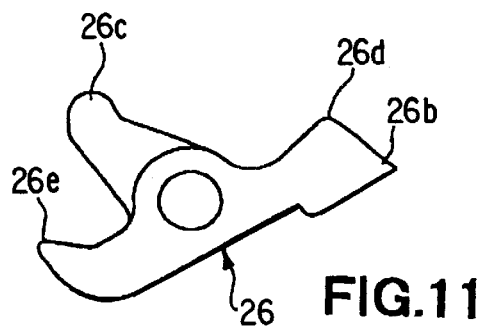
FIG. 11 is a diagram explaining the lock arm according to the first embodiment.

A spring hook 21 for hooking one end of the extension coil spring 36, wherein the other end thereof is hooked to the hook 17c of the retaining plate 17, is provided to the inner face of the ratchet wheel 18. The extension coil spring 36 rotationally urges the ratchet wheel 18 in the webbing protracting direction (direction of arrow X2) in relation to the reel 3. As shown in FIG. 11, the lock arm 26 is provided with an engagement pawl 26b for engaging with the inner gear teeth 34a of the gear case 34, and an arm 26c for pressing the longitudinal central portion of the linear sensor spring 25, wherein both ends thereof are supported by a pair of hooks 18d provided on the exterior face of the ratchet wheel 18.

The lock arm 26 thereby structures a stopper member for preventing the rotation of the ratchet wheel 18 in the webbing protracting direction by the engagement pawl 26b engaging with the inner gear teeth 34a, which are engaging members. The engagement pawl 26b is pressure urged toward the contact portion 32 of the inertia plate 30 due to the urging force of the sensor spring 25. Incidentally, an opening is formed in the ratchet wheel 18 corresponding to the rocking range of the arm 26c, and the arm 26c passes through such opening. This is in order to guarantee the state of engagement of the arm 26c with the sensor spring 25.

The contact portion 32 is structured as a cam face to which the engagement pawl 26b of the lock arm 26 slidably contacts, comprising a first cam face 32a wherein the inertia plate 30 does not influence the lock arm 26, and a second cam face 32b which reciprocates the lock arm 26 such that the engaging pawl 26b engages with the inner gear teeth 34a in accordance with the rotation delay of the inertia plate 30 in relation to the reel 3.

In the unlocked state of the emergency locking mechanism, the first cam face 32a is in contact with the back portion 26d of the lock arm 26 and, until the rotation delay of the inertia plate 30 in relation to the reel 3 exceeds a prescribed value, the back portion 26d will not come in contact with the second cam face 32b. The length of the first cam face 32a (i.e., rotation quantity of the inertia plate 30 in a state where the back portion 26d is slidably in contact with the first cam face 32a) is set such that, even if the rotation delay of the inertia plate 30 in relation to the reel 3 occurs due to the inertial force working on the inertia plate 30 when the webbing 302 is completely retracted, the back portion 26d of the lock arm 26 will not reach the second cam face 32b with such level of rotation delay.

Figure 14:
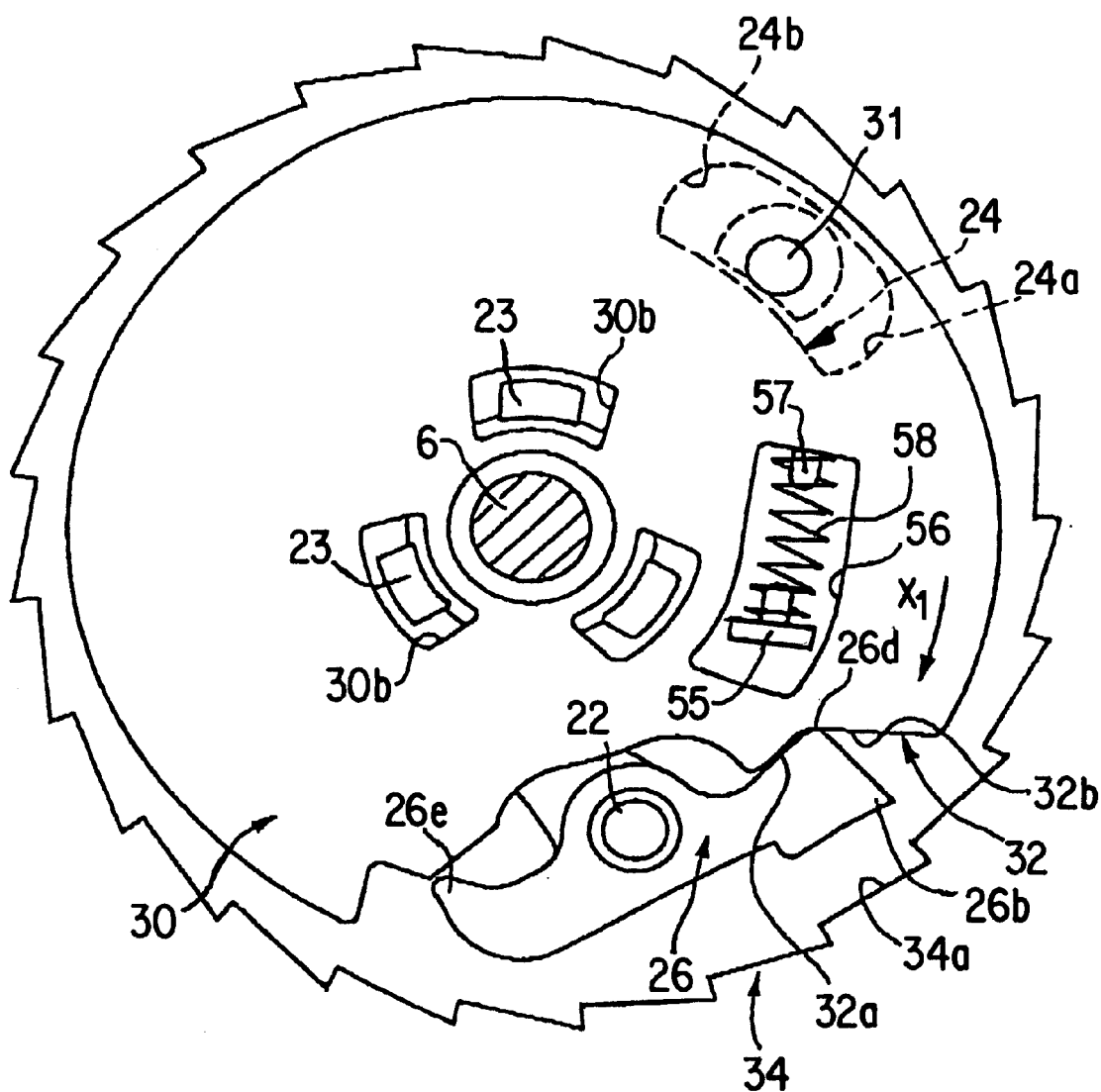
FIG. 14 is a diagram explaining the activation of the locking mechanism caused by the webbing acceleration according to the first embodiment.
Figure 15:
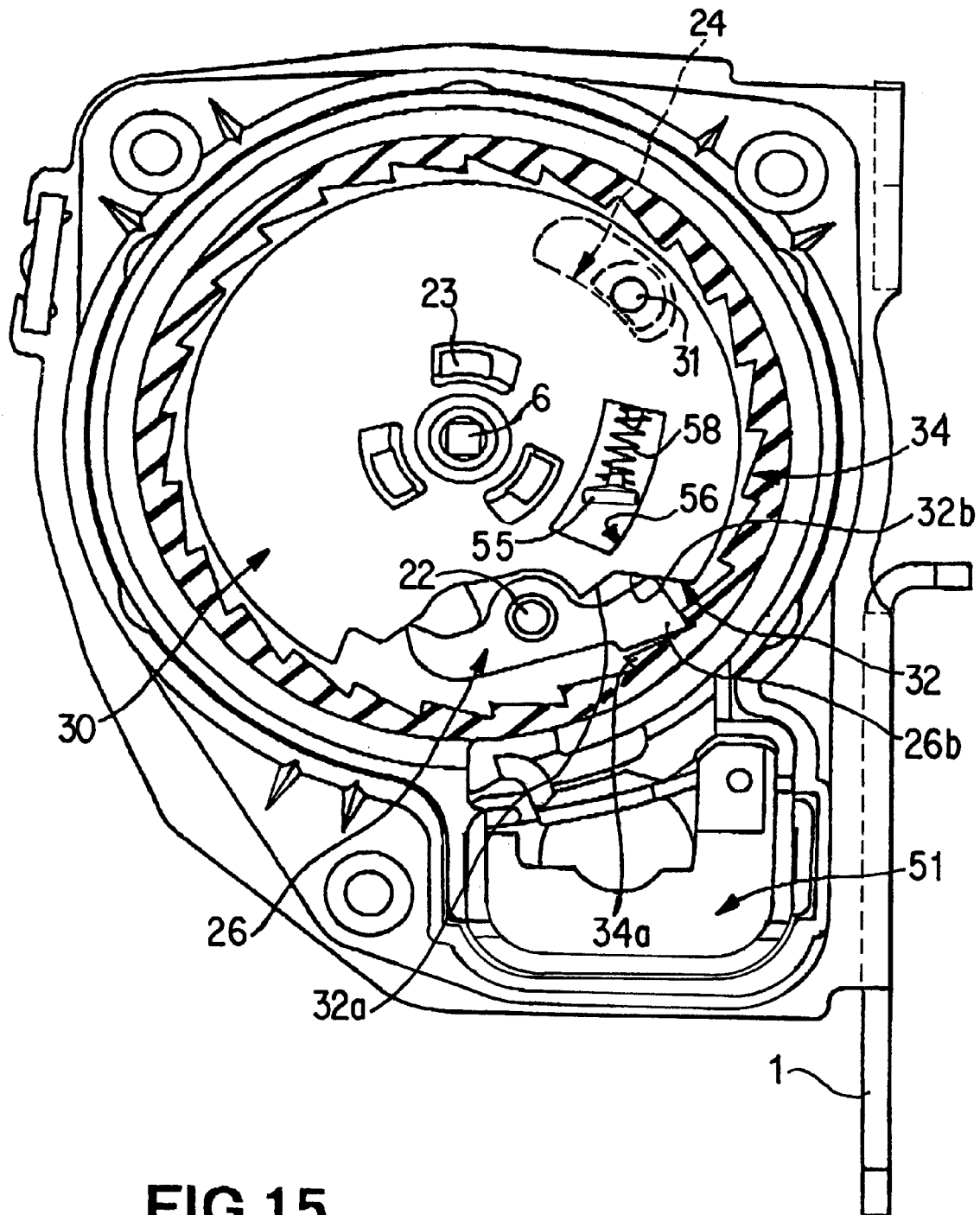
FIG. 15 is a diagram explaining the activation of the locking mechanism caused by the webbing acceleration according to the first embodiment.

Regarding the lock arm 26 of the first embodiment, a contact pawl 26e is formed on the rocking end on the side opposite to the engagement pawl 26b. In correspondence with this contact pawl 26e, a step 33 capable of coming in contact with the contact pawl 26e is provided to the inertia plate 30. The step 33 restricts the movement in the locking direction of the lock arm 26 by coming in contact with the contact pawl 26e when the inertia plate 30 is in an unlocked state and in its initial position. As shown in FIGS. 14 and 15, when a rotation delay exceeding a prescribed value occurs to the inertia plate 30 and the back portion 26d of the lock arm 26 comes in contact with the second cam face 32b, the lock arm 26 is able to reciprocate in the locking direction due to the pressure effect of the second cam face 32b.

A rocking lever 20, which is supported by the shaft hole 20a, is rockingly provided to the spindle 19 protrusively formed on the inner face of the ratchet wheel 18. The rocking lever 20 is assembled between the reel 3 and the ratchet wheel 18 such that the rotation thereof in the counterclockwise direction is adequately restricted by the stopper protrusion 8 protrusively formed on the sensor side end face of the reel 3, and the rotation thereof in the clockwise direction is adequately restricted by the pressure protrusion 16d protrusively formed on the sensor side face of the pole 16 coming in contact between the spindle 19 and the stopper protrusion 8.

Provided to the central portion of the gear case 34 arranged on the exterior of the inertia plate 30 is a shaft supporter 34b for rotatably supporting the reel 3 via the spindle 6. A collar 6a of the spindle 6 is in contact with the bottom face of the axis supporter 34b, and is the face for determining the position of the axial direction of the reel 3. Provided to the lower part of the gear case 34 is a housing 50 in a shape of a box for housing the vehicle acceleration sensor 51, which is an inertia sensing element, for sensing the acceleration of the vehicle. A sensor cover 35 is provided on the exterior of the side plate 1a covering the gear case 34.

The activation of the seatbelt device retractor according to the first embodiment is now explained.

In an ordinary state of use, as shown in FIG. 13, the ratchet wheel 18 is urged in the webbing protracting direction (direction of arrow X2 in FIG. 13) in relation to the reel 3 due to the urging force of the pull coil spring 36 hooked on spring hook 21 and the hook 17c of the plate 17. Thus, the pole 16, wherein the engagement protrusion 16b thereof engages with the cam hole 18a, is urged in a disengagement direction with the inner gear teeth 2. Thus, the reel is rotatable and the webbing is protractable.

When the webbing acceleration sensor inclusive of the inertia plate 30 or the vehicle acceleration sensor 51 is activated in emergency situations such as upon a collision, the lock arm 26 or the sensor arm 53, which are stopper elements for preventing the rotation of the locking activation element in the webbing protracting direction, prevents the rotation of the ratchet wheel 18 in the webbing protracting direction and activates the retractor locking element.

When the vehicle acceleration sensor 51 or the webbing acceleration sensor is activated and the webbing 302 is protracted from the retractor 100A after the rotation of the ratchet wheel 18 has been prevented in the webbing protracting direction, the ratchet wheel 18 generates a rotation delay in relation to the reel 3, and relatively rotates in the webbing retracting direction (direction of arrow X1). Thus, the cam hole 18a of the ratchet wheel 18 moves the engagement protrusion 16b of the pole 16 from the rotational central axis of the reel 3 outward toward the radius direction. The pole 16 thereby rockingly rotates around the spindle 7 in the engagement direction (direction of arrow Y1 in FIG. 7) with the inner gear teeth 2.

When the webbing 302 is further protracted from the retractor 100A, the engagement teeth 16c of the pole 16 engage with the inner gear teeth 2, and such engagement is completed. In this state, there is a gap between the pole rear end portion 16e of the pole 16 and the pressure receiving face 45 of the reel 3, and the rotation of the rocking lever 20 is restricted to be substantially without any looseness by the stopper protrusion 8 of the reel 3 and the pressure protrusion 16d of the pole 16.

Here, the shaft hole 16a of the pole 16 is loosely engaged with the spindle 7 of the reel 3, and as it is further supported in relation to the reel 3 in a rockingly rotatable manner and enabling a prescribed relative displacement, when the webbing 302 is further protracted from the retractor 100A, the pole 16 relatively rotates around the rotational central axis of the reel 3 until the pole rear end portion 16e comes in contact with the pressure receiving face 45.

Although the pressure protrusion 16d of the pole 16 is in an immovable position relationship with respect to the side plate 1a, the stopper protrusion 8 of the reel 3 rotates in the webbing protracting direction (direction of arrow X2). By this movement, the rocking lever 20 is rockingly rotated in the clockwise direction shown in FIG. 8 as the rocking end is pressed by the stopper protrusion 8 with the contact point with the pressure protrusion being the rotational fulcrum. When the rocking lever 20 rockingly rotates in the clockwise direction shown in FIG. 8 with the contact point with the pressure protrusion being the rotational fulcrum, the shaft hole 20a supported by the spindle 19 of the ratchet wheel rotates in the webbing retracting direction (direction of arrow X1) in relation to the rotational central axis of the reel 3. As a result thereof, the ratchet wheel 18 rotates in reverse in the webbing retracting direction in relation to the reel 3.

Therefore, even if the vehicle acceleration sensor 51 or webbing acceleration sensor is activated and the locking element of the retractor 100A is in a locked state and preventing the reel 3 from rotating in the webbing protracting direction, the ratchet wheel 18, which the rotation in the webbing protracting direction is prevented, is capable of disengaging the sensor arm 53 of the vehicle acceleration sensor 51 or the lock arm 26 of the webbing acceleration sensor from the engagement with the inner gear teeth of the gear case 34.

Figure 7:
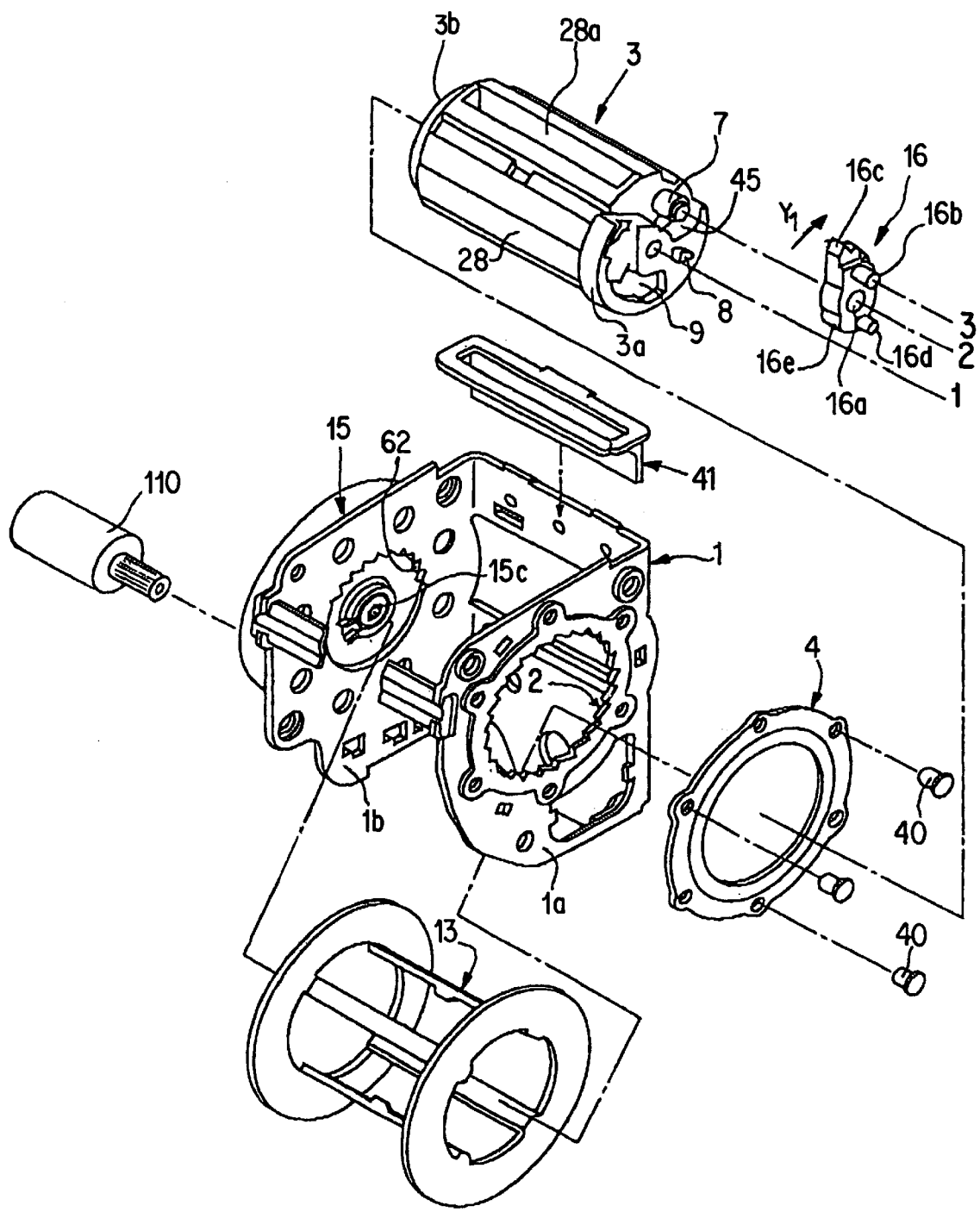
FIG. 7 is a perspective view showing an example of one portion of the webbing retractor according to the first embodiment.

When further tension works on the webbing 302 when the pole 16 is in a locked state, the portion supporting the axis supporter 34b of the gear case 34 and the axis 15c of the timing belt 15 transforms, and the reel 3 tries to move upward. This movement is prevented by the contact face 3a and groove 3b formed on the reel 3 respectively coming in contact with the inner gear teeth 2 and the engagement teeth 62 on the side plate 1b (c.f. FIG. 7), and such faces receive the tension working on the webbing 302.

When the vehicle comes to a halt and the tension working on the webbing 302 is relieved, as the engagement with the ratchet wheel 18 and the sensor arm 53 or the inner teeth gear 34a of the gear case 34 of the lock arm 26 is already disengaged, the ratchet wheel 18 rotates in the arrow X2 direction in relation to the reel 3 due to the urging force of the pull coil spring 36 and the cam hole 18a of the ratchet wheel 18 moves the engagement protrusion 16b of the pole 16 toward the rotational central axis side of the reel 3. Here, the tension working on the protracting direction of the webbing 302 is relieved, and, as the reel 3 is able to rotate in the webbing retracting direction (direction of arrow X1), when the reel 3 rotates in the direction of arrow X1 until the tip of the engagement teeth 16c of the pole 16 does not interfere with the tip of the inner gear teeth 2, the pole 16 rockingly rotates around the spindle 7 in the direction to disengage the engagement with the inner gear teeth 2, and the webbing becomes freely protractable as the reel 3 is unlocked.

Next, when the DC motor 110 retracts the webbing from its protracted state and when the webbing 302 is rapidly and completely retracted in accordance with the rotational power of the timing belt 15, as the inertia plate 30, which is the inertial member of the webbing acceleration sensor, keeps on rotating in the retracting direction in relation to the reel 3 which suddenly stopped rotating, the inertia plate 30 continues rotating in the retracting direction in relation to the reel 3 and a rotational delay arises with regard to the reel 3 in terms of the protracting direction of the reel 3. Nevertheless, the contact portion 32 of the inertia plate 30 for reciprocating the engagement pawl 26b of the lock arm 26 in the engagement direction with the inner teeth gear 34a of the gear case 34 is structured of two cam faces 32a, 32b for reciprocating the engagement pawl 26b toward the inner teeth gear 34a after the rotational delay in relation to the reel 3 of the inertial plate 30 has reached a prescribed value. Thus, until the rotational delay of the inertia plate 30 with regard to the reel 3 reaches a prescribed value, the engagement pawl 26b will not reciprocate in the engagement direction with the inner teeth gear 34.

Figure 8:
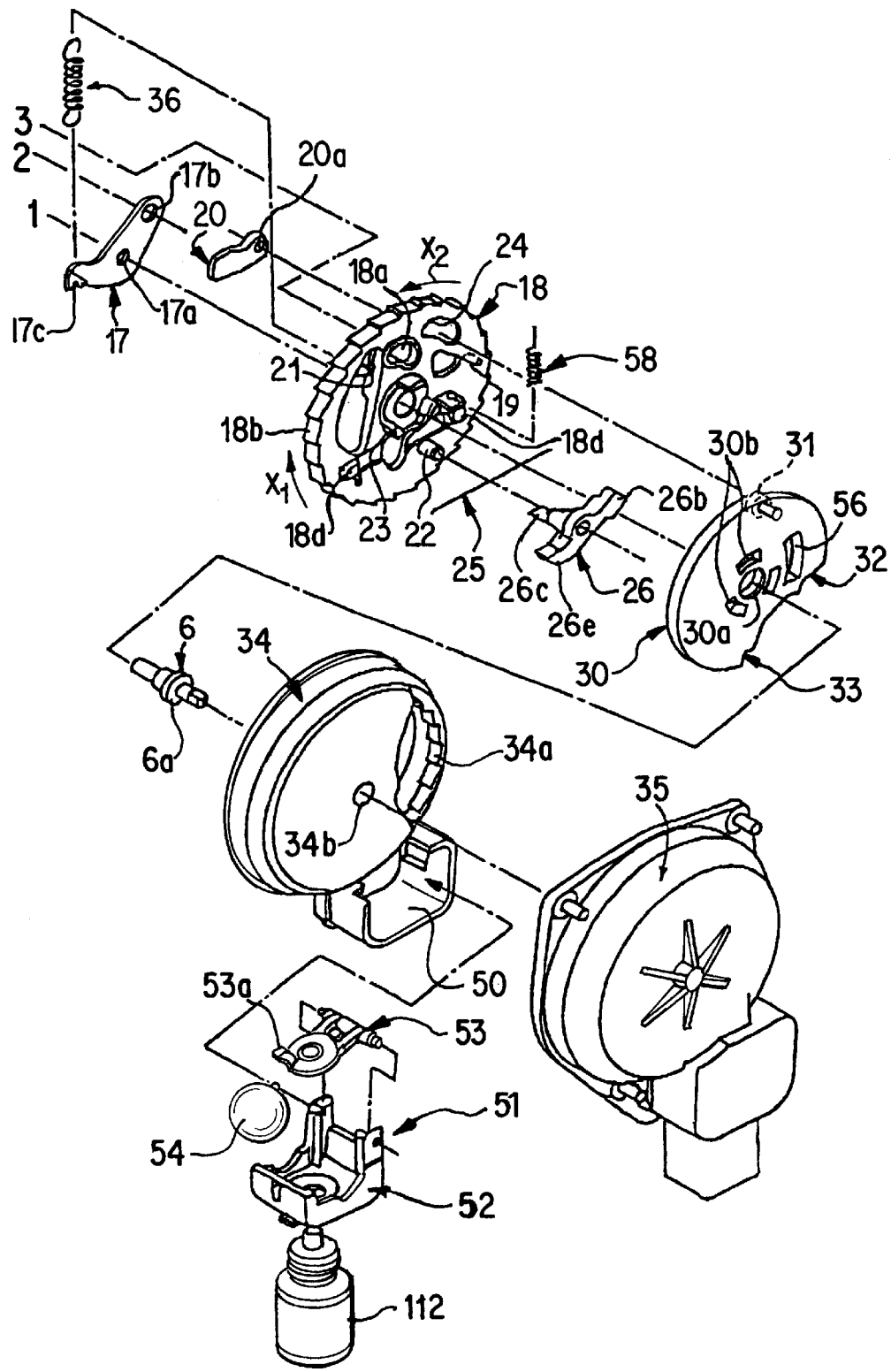
FIG. 8 is a perspective view showing an example of the other portions of the webbing retractor according to the first embodiment.
Figure 9:
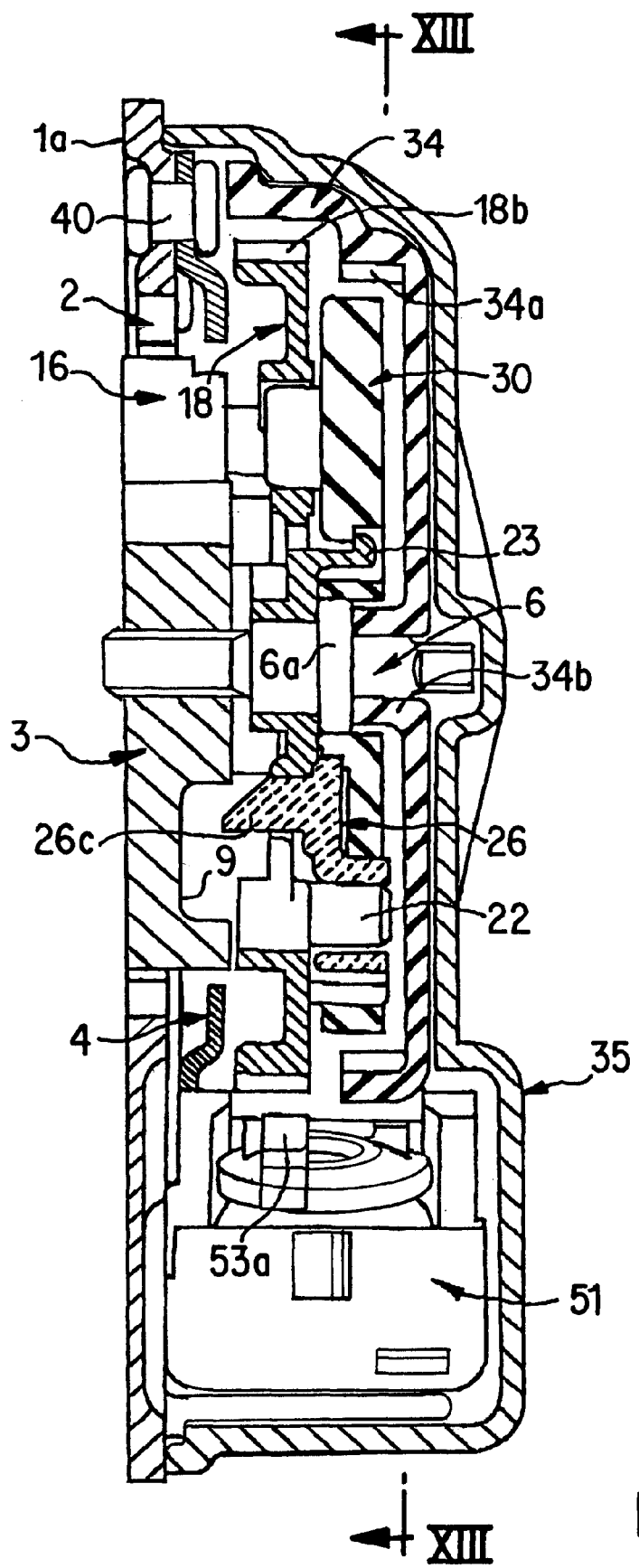
FIG. 9 is a sectional view in the rotational axial direction of the ratchet wheel of the locking mechanism shown in FIG. 13.
Figure 16:
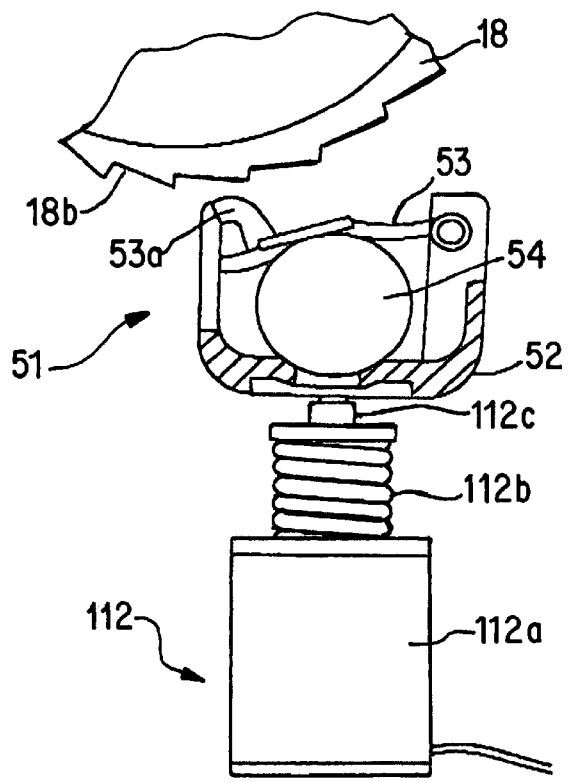
FIG. 16 is a diagram explaining the operation of the electromagnetic actuator (unlocked state) according to the first embodiment.
Figure 17:
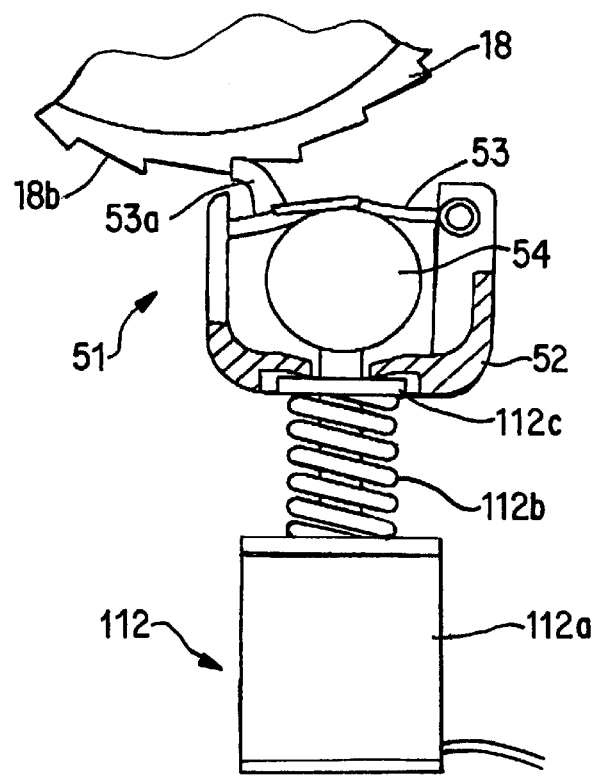
FIG. 17 is a diagram explaining the operation of the electromagnetic actuator (locked state) according to the first embodiment.

The present invention according to this embodiment is structured as above, and an electromagnetic actuator 112 is further provided to the activating locking mechanism as shown in the lower part of FIG. 8. The electromagnetic actuator 112, as shown in FIGS. 16 and 17, is structured of a solenoid (excitation coil) 112a, coil spring (elastic member) 112b, plunger with a collar (magnetic core) 112c, and arranged at the lower part of the vehicle acceleration sensor 51.

In a normal state, the solenoid 112a is excited. In such state, as shown in FIG. 16, the plunger 112c does not contact the ball weight 54, and does not influence the locking mechanism 102. When the controller 200 releases the excitation of the solenoid 112a in order to lock the webbing (S28), the plunger 112c is raised due to the urging force of the spring 112b. The tip of the plunger 112c passes through the opening at the bottom face of the sensor cover 52 and thrusts the ball weight 54. When the ball weight 54 is pushed up, the sensor arm 53 moves in the upper direction in FIG. 16, and the stopper protrusion 53a engages with the ratchet teeth 18b of the ratchet wheel 18. Thereby, the rotation of the ratchet wheel 18 in the webbing protracting direction (direction of arrow X2 in FIG. 8) is prevented. When the webbing is protracted and the reel 3 rotates in the protracting direction, the rotational difference in the stopped ratchet wheel and the reel 3 moves the pole 16 outward toward the radius direction of the reel 3, and engages with the inner gear teeth 2 of the frame 1a. The rotation in the protracting direction of the reel 3 is thus prevented.

In this example, when the locking operation is not conducted and the excitation current is cut off while supplying an excitation current to the solenoid 112a, the locking operation is endeavored. That is, the locking mechanism 102 is activated by low-level activation signals being supplied thereto. Therefore, even if power to the seatbelt device is cut off, the webbing 302 can be locked.

Figure 18:
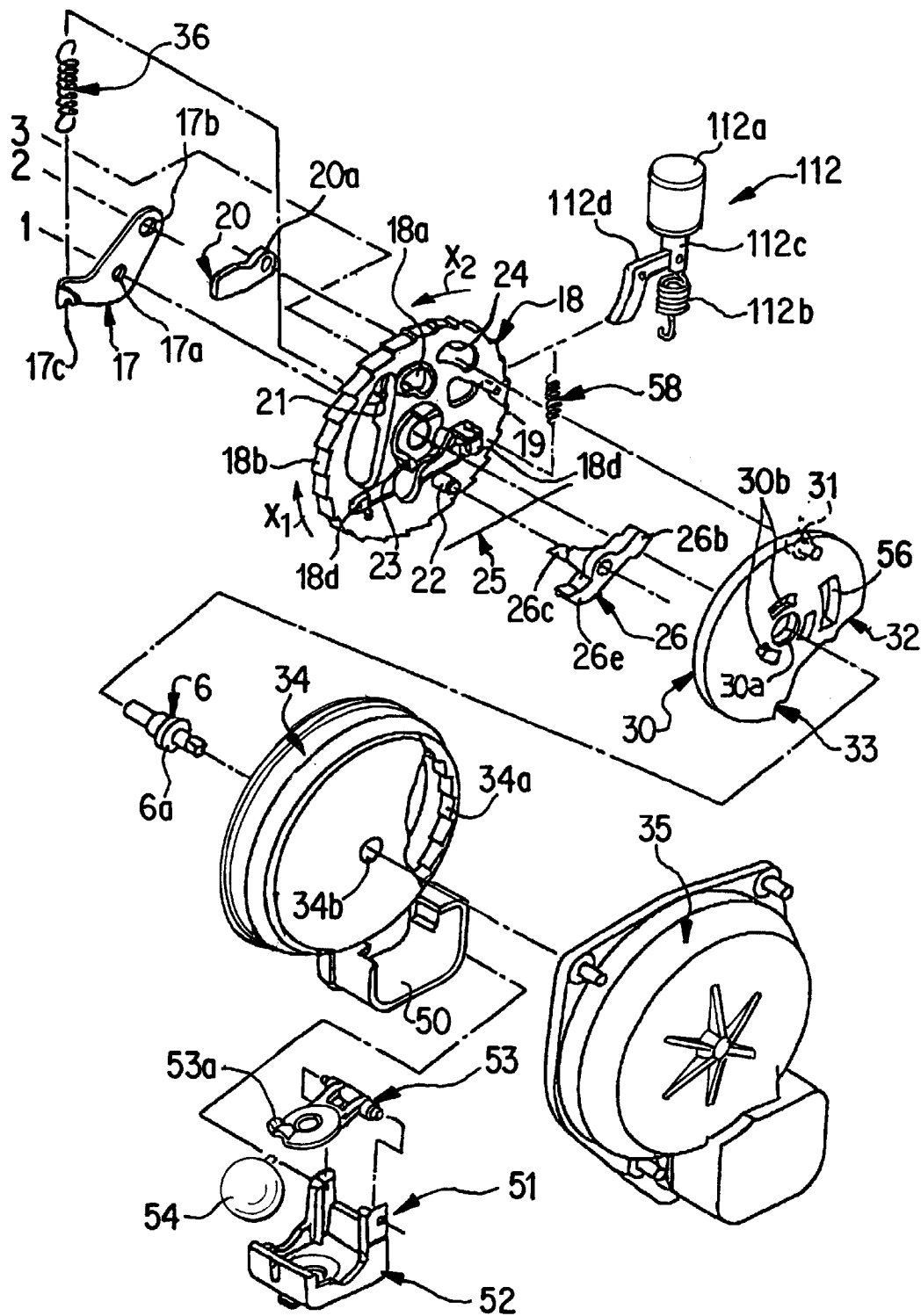
FIG. 18 is a diagram explaining an example of another electromagnetic actuator.
Figure 19:
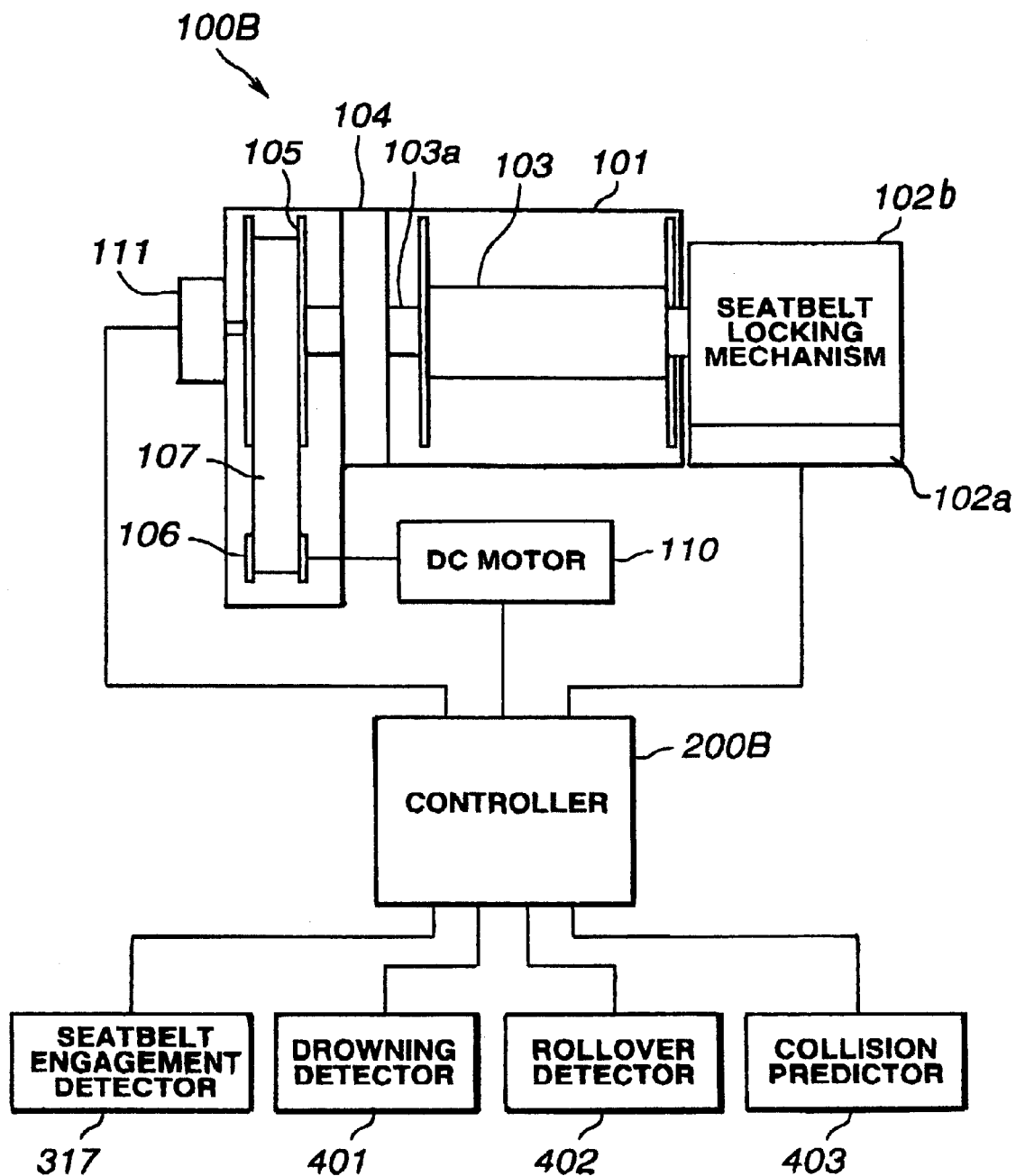
FIG. 19 is a diagram explaining the retractor according to the second embodiment of the present invention.

FIG. 18 shows another structural example of the electromagnetic actuator. In this example, the electromagnetic actuator 112 is structured of a solenoid 112a, plunger 112c, approximate L-shaped lever 112d wherein one end thereof is engaged with the plunger 112c and the central portion thereof is rotatably supported, and a coil spring 112b for applying urging force to the lever 112d in the clockwise direction in FIG. 18. When the pawl of the lever 112d moves and comes in contact with the teeth face 18b of the ratchet wheel 18, the rotation of the ratchet wheel 18 is prevented and the locking mechanism by the pole 16 and inner gear teeth 2 of the frame is activated.

In the normal state where an excitation current is being supplied from the controller 200A to the solenoid 112a, the solenoid 112a draws the plunger 112c near in resistance to the coil spring 112b, and the pawl on one end of the lever 112d rotatably supported at the other end with the plunger 112c is separated from the ratchet wheel 18. Therefore, the locking mechanism is not activated.

Next, when the CPU detects a malfunction (S26, S32), the supply of the excitation current from the controller 200A is cut off in order to lock the webbing (S28). The plunger 112c is protracted in the downward direction of FIG. 18 by the urging force of the coil spring 112b, and the lever 112d rotates. Thereby, the pawl of one end of the lever 112d engages with the teeth 18b of the ratchet wheel 18 and prevents the rotation of the ratchet wheel 18 in the webbing protracting direction. When the webbing 302 is protracted and the reel 3 rotates in the protracting direction, the pole 16 moves outward toward the radius direction due to the rotational difference between the stopped ratchet wheel 18 and the reel 3, and engages with the inner gear teeth 2 of the frame 1a. Thereby, the rotation of the reel 3 in the protracting direction is prevented, and the lock is completed.

According to the present invention of this embodiment, when a malfunction in the motor or retraction/protraction is detected, it is possible to reliably secure the passenger as the protraction of the webbing is prevented due to the activation of the locking mechanism. Further, it is preferable in that the locking of the webbing is secured by the mechanical locking mechanism even if the power etc. to the motor is cut off.

In the first embodiment, described was an emergency locking mechanism of the type comprising a webbing acceleration sensor as well as a vehicle acceleration sensor, but needless to say, the seatbelt device of the present invention may be a retractor comprising only the webbing acceleration sensor, or only the vehicle acceleration sensor.

According to the seatbelt device of the first embodiment, when a malfunction in the webbing retraction/protraction by the DC motor is detected, the protraction of the webbing is locked. Thus, it is possible to reduce, as much as possible, the slack in the webbing upon a vehicle accident.

(Second Embodiment)

The seat belt device of the present invention according to the second embodiment is now explained with reference to the relevant drawings. The components of the second embodiment which are the same as those in the first embodiment are given the same reference numerals, and the explanation thereof is omitted.

The difference between the seatbelt device of the second embodiment and the seatbelt device of the first embodiment is in the structure of the webbing locking mechanism 102B of the retractor 100B and the controller 200B.

That is, the locking mechanism 102B of the second embodiment comprises a compulsory unlocking mechanism 102a.

Figure 24:
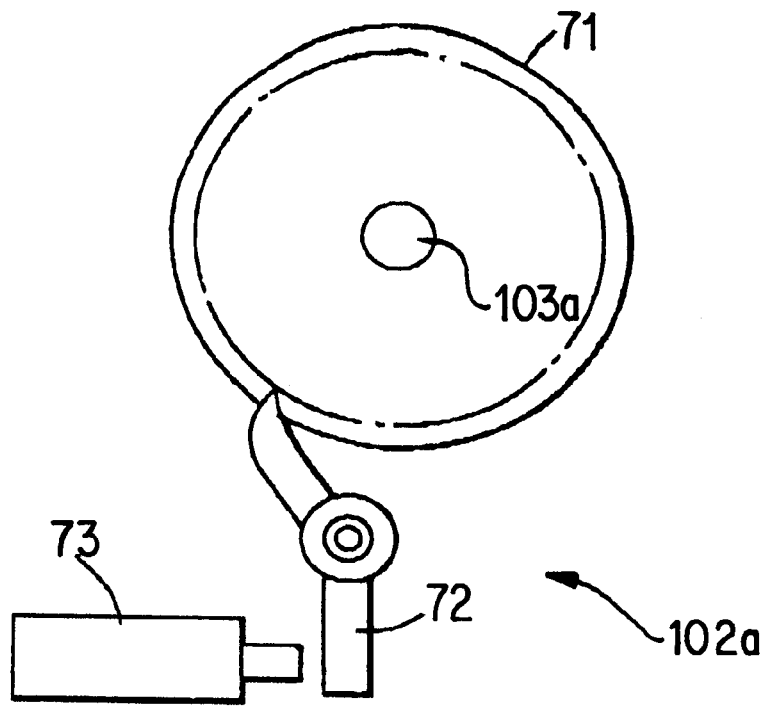
FIG. 24 is a diagram explaining an example of the unlocking mechanism (lock activated state) according to the second embodiment.

FIG. 24 shows an example of the compulsory unlocking mechanism 102a. The latch plate 71 constituting a part of the locking mechanism 102B is mounted on the reel shaft 103a. Teeth are formed on the outer periphery of the latch plate 71, and locking is secured by the tip of the pole 72, wherein the center thereof is rotatably supported by a frame (not shown), engaging with such teeth. Normally, the locking operation is adequately controlled by the emergency locking mechanism which is activated upon detecting the webbing 302 (c.f. FIG. 1) exceeding a prescribed protraction acceleration, the emergency locking mechanism which is activated upon detecting an acceleration working on a vehicle exceeding a prescribed value, or an automatic locking mechanism.

Figure 25:
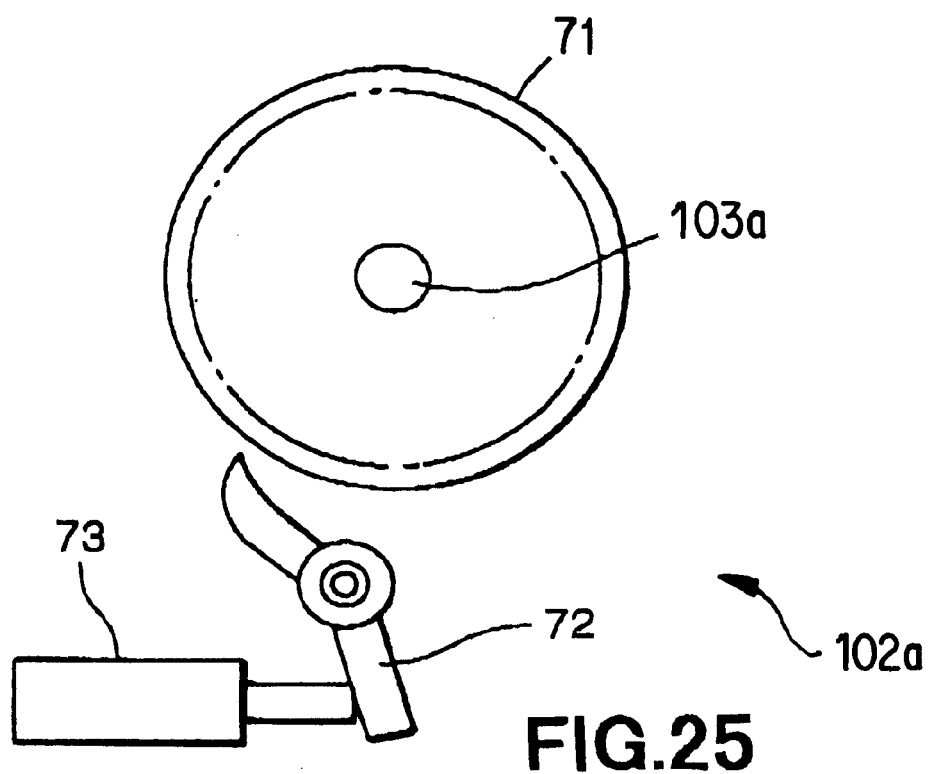
FIG. 25 is a diagram explaining an example of the unlocking mechanism (unlocked state) according to the second embodiment.

The compulsory unlocking mechanism 102a is provided with a pole actuator 73 and is activated by activation signals from the controller 200B. When the pole actuator 73 operates, as shown in FIG. 25, the rod is extended to compulsorily extend the pole 72, and the pole 72 is unlocked. Thereby, the reel shaft 103a is freed and the protraction of the webbing is enabled.

Figure 26:
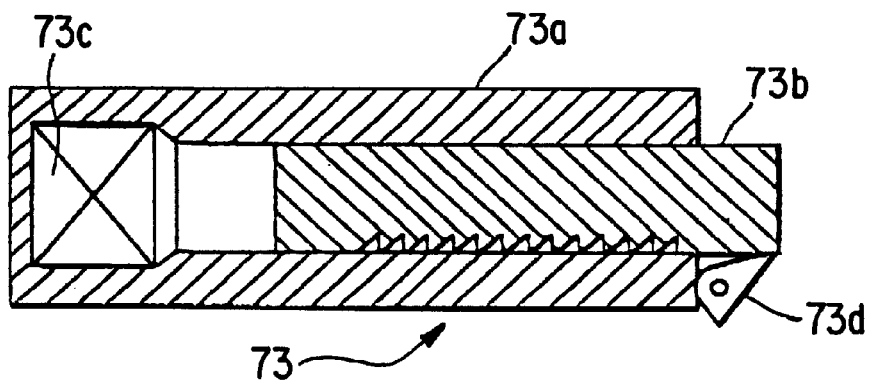
FIG. 26 is a sectional view explaining the inactive state of the pole actuator according to the second embodiment.
Figure 27:
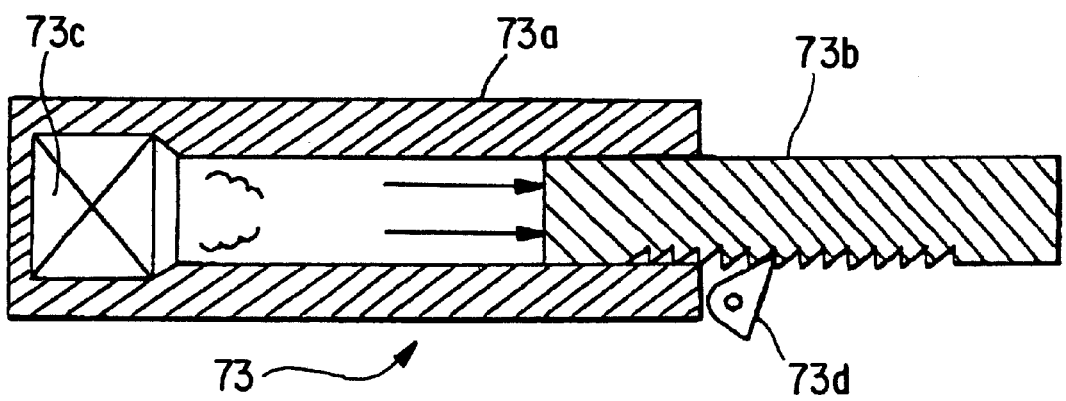
FIG. 27 is a sectional view explaining the active state of the pole actuator according to the second embodiment.
Figure 29:
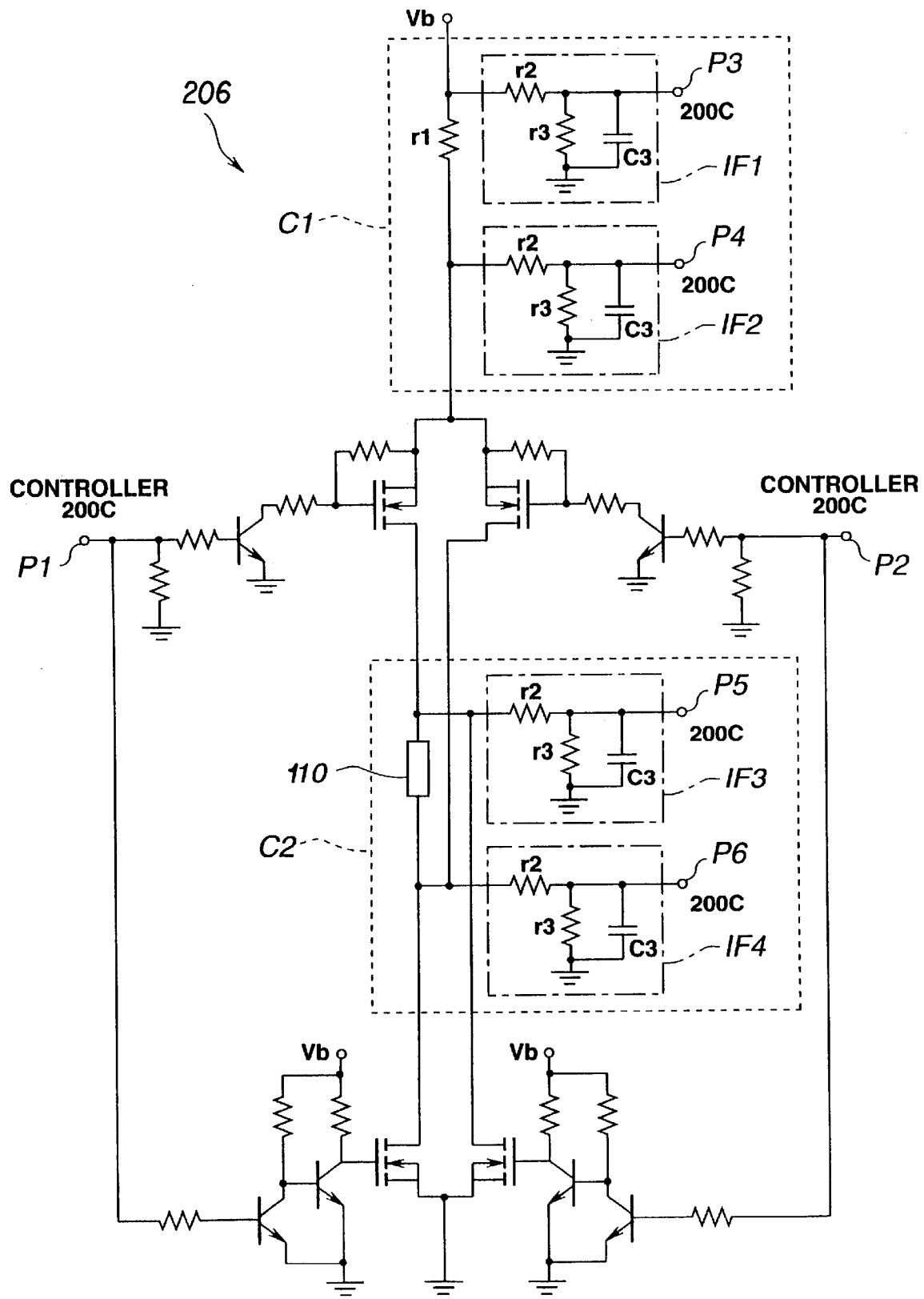
FIG. 29 is a circuit diagram of the motor drive circuit according to the third embodiment.

FIGS. 26 and 27 show structural examples of the pole actuator 73. Built in to the pole actuator 73 is a rod 73b provided with a ratchet (teeth) on the inside of a cylinder 73a, and a gas generator 73c is provided to the bottom face of this cylinder 73a. Provided to the outlet of the cylinder 73a is a stopper 73d for stopping the ratchet and preventing the rod 73b from returning. When activation (ignition) signals from the controller 200B are supplied to the gas generator 73c, as shown in FIG. 29, the powder ignites and expansion gas is generated, and the rod 73b in the cylinder 73a is pushed out. As shown in FIG. 25, the rod 73b rotates the pole 72 and compulsorily unlocks the system.

Similar to the first embodiment, provided to the left end of the reel shaft 103a are a pretensioner 104, pulley 105, and potential meter 111.

Supplied to the controller 200B are the respective outputs from the seatbelt device detector 317 for detecting the engagement/disengagement of the seatbelt device, drowning detector 401 for detecting the drowning of a vehicle, rollover detector 402 for detecting the rollover of a vehicle, and collision predictor 403 for predicting the possibility of a collision between one's vehicle and an obstacle.

As the drowning sensor 401, for example, a sensor capable of detecting the capacitance change between the electrodes due to water or seawater seeping therebetween may be used. The impedance of this sensor is measured with an impedance-measuring device and, when it is lower than a prescribed impedance value, the vehicle is determined as having drowned. This drowning detector 401 is arranged, for example, at the lower part of the vehicle interior at the center console etc.

The rollover detector 402, for example, may be structured of a roll angle sensor and a judgment unit. The roll angle sensor, for example, may be structured by utilizing a distortion gauge acceleration sensor for detecting the acceleration in the upward and downward directions. The judgment unit judges a rollover when the roll angle exceeds a prescribed value. For example, the detection acceleration is 1G during the normal travelling of a vehicle, but when the vehicle rotates its front and back directions as the axial direction, it becomes 0.5 G at a 45-degree rotation. Therefore, it is possible to judge a rollover by the change in the gravitational value.

The collision predictor 403 measures the distance to the obstacle with the likes of an infrared laser radar, millimeter wave radar, or ultrasonic radar and calculates the time until collision by dividing such obtained distance with the time variation amount (speed) of such distance. If the time until collision is less than a prescribed value, 0.1 second for example, the collision predictor 403 judges that a collision is unavoidable, and outputs collision signals.

FIG. 20 is a block diagram explaining the outline of the structure of the controller 200B. Similar to the first embodiment, this controller 200B is structured of a microcomputer system. The CPU 201 loads the control program and data retained by the ROM 202 to the work area of a RAM 203, implements various programs explained later, and controls operations such as the compulsory unlocking of the seatbelt locking mechanism, and the normal rotation, reverse rotation, and suspension of the DC motor 110. The output voltage corresponding to the rotation quantity of the aforementioned potential meter 111 is A/D converted in a prescribed cycle by an A/D converter of the input interface 204. The input interface 204 has a CPU built therein and writes the converted output voltage data to the rotational field of the axis 103a of the RAM 203 by DMA operation. The CPU also monitors the output voltage data. For example, the CPU compares the values of the previous and present output voltage data, judges the state of the reel shaft axis 103a, namely the state of normal rotation, reverse rotation, or suspension of rotation, and sets the corresponding flag to the flag register of the RAM 203 by DMA operation.

The CPU of the input interface 204 sets a flag representing the engagement/disengagement of the seatbelt device to a flag register of the RAM 203 upon receiving the output of the seatbelt engagement detector 317 built in the buckle of the seatbelt device and which generates an output corresponding to the engagement of the webbing.

The CPU of the input interface 204 sets a drowning flag to the flag register of the RAM 203 upon receiving signals from the drowning detector 401 representing that the vehicle has drowned.

The CPU of the input interface 204 sets a rollover flag to the flag register of the RAM 203 upon receiving signals from the rollover detector 402 showing the rollover of a vehicle.

The communication interface 216 is structured of a microcomputer system and, when the collision predictor outputs collision signals, sets a collision flag to the flag register of the RAM 203 by DMA operation.

When the prescribed conditions set to the control program explained later are fulfilled, the CPU 201 provides to the output interface 205 an unlocking order, and normal rotation order, reverse rotation order, or suspension order of the DC motor 110. The output interface 205 supplies activation signals (ignition signals) to the gas generator 73c of the compulsory unlocking mechanism 102a in correspondence with the unlocking order. The output interface 205 further generates gate control signals G1, G2 corresponding to the normal rotation order, reverse rotation order, or drive suspension order and controls the power transistor bridge circuit of the motor drive circuit 206. The motor drive circuit 206 supplies to the DC motor 110 normal direction drive current or reverse direction drive current, or suspends such supply.

Figure 22:
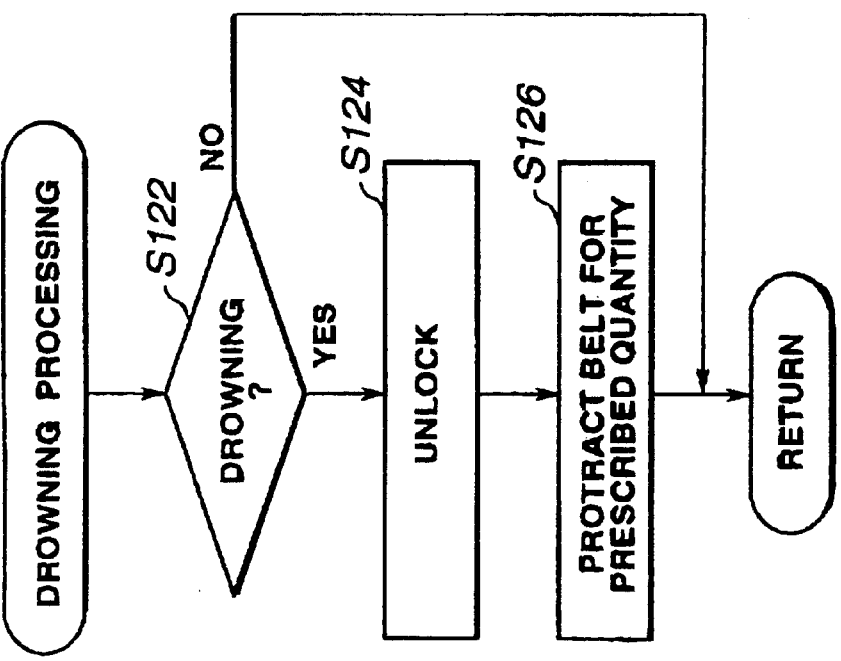
FIG. 22 is a flowchart explaining the belt-protraction processing of the CPU in response to the drowning of a vehicle according to the second embodiment.
Figure 21:
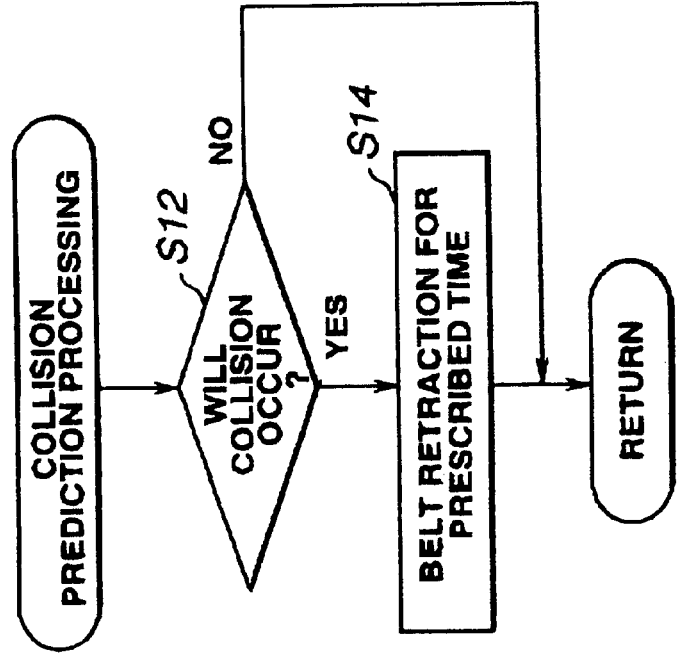
FIG. 21 is a flowchart explaining the belt-retraction processing of the CPU in response to a collision prediction according to the second embodiment.
Figure 23:
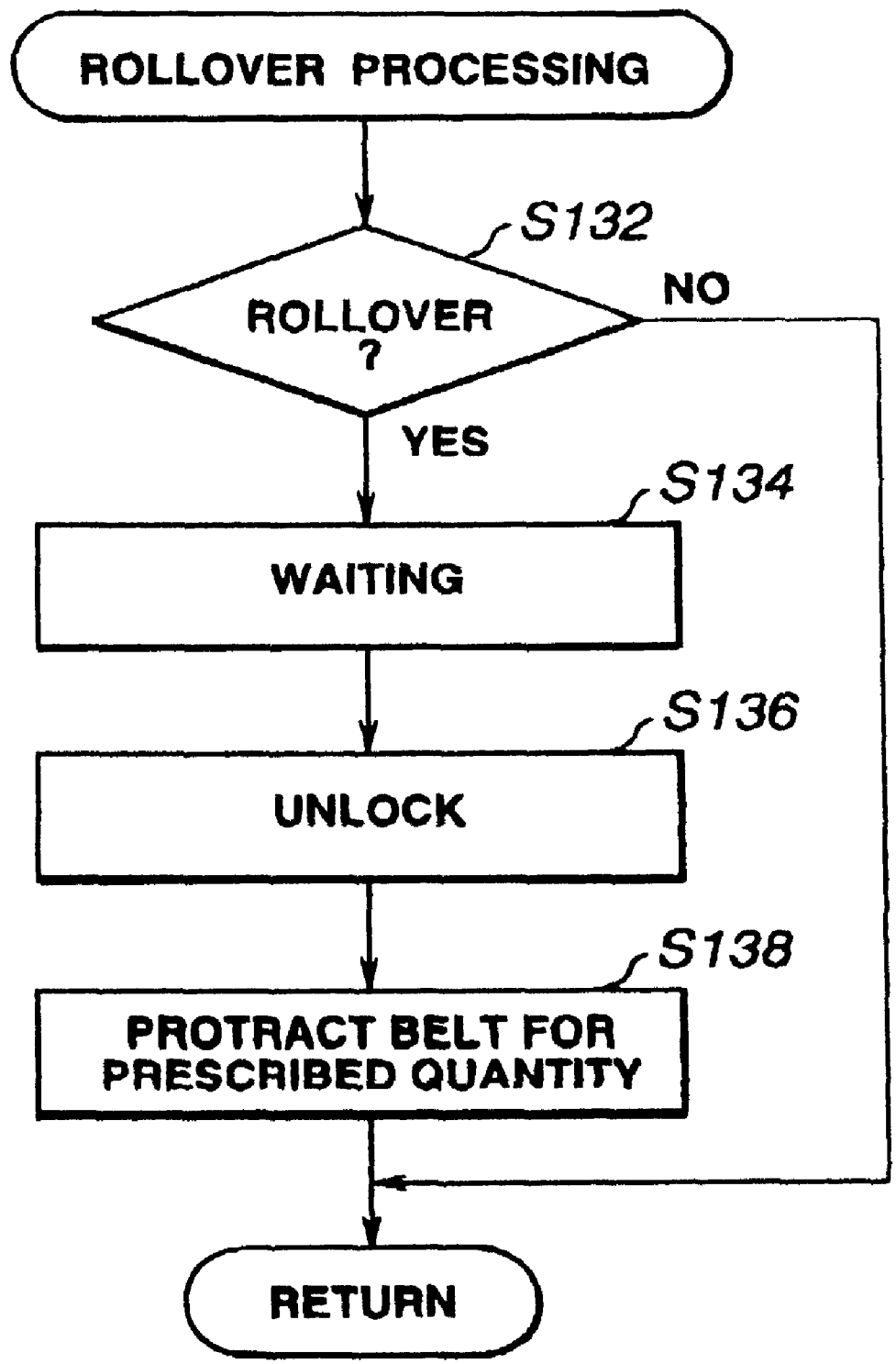
FIG. 23 is a flowchart explaining the belt-protraction processing of the CPU in response to the rollover of a vehicle according to the second embodiment.

FIGS. 21 through 23 are flowcharts explaining the operation of the CPU 201 of the controller 200B. The CPU 201 monitors the flag register periodically or in accordance with the generation of interrupt orders. The CPU 201 judges whether a collision flag has been set to the flag register (S12). If the collision flag has been set (S12; YES), the CPU 201 orders the output interface 205 to retract the seatbelt for a predetermined time, 5 seconds for example. Thereby, the DC motor 110 rotates the reel shaft 103a in the webbing retracting direction, secures the passenger to his/her seat by removing the slack in the webbing, and seeks the safety of the passenger upon a collision (S14). If the collision flag has not been set (S12; NO), the CPU 201 checks other flags.

Next, the CPU 201 judges whether a drowning flag has been set to the flag register (S122). If a drowning flag has been set to the flag register (S122; YES), in order to provide a certain degree of slack to the seatbelt (30 cm for example) such that a passenger may escape even if he/she is wearing the seatbelt, the CPU 201 activates the actuator 73 by supplying activation signals to the compulsory unlocking mechanism of the seatbelt device of the retractor 100B, compulsorily unlocks the webbing 302, and makes the reel shaft 103a rotatable (S124). The CPU 201 orders the reverse rotation (seatbelt protracting direction) of the DC motor 110 to the output interface 205. When the DC motor 110 rotates, the CPU 201 detects the rotation quantity with the output of the potential meter 111 and, when it becomes a prescribed quantity, orders the suspension of the DC motor 110 to the output interface 205 (S126). When a drowning flag has not been set to the flag register (S122; NO), the CPU 201 checks other flags.

Next, the CPU 201 judges whether a rollover flag has been set to the flag register (S132). When a rollover flag has been set to the flag register (S132; YES), as the passenger is upside down due to the rollover and there is fear that such passenger may hit his/her head on the vehicle ceiling due to the impact of the rollover, the CPU 201 does not protract the webbing until a predetermined time elapses sufficient for the collision to abate from the time the rollover is detected (S134). After the impact from the rollover has abated, the CPU 201 provides activation signals to the compulsory unlocking mechanism 102a and unlocks the reel shaft 103a by activating the actuator 73 (S136). Next, the CPU 201 rotates the DC motor 110 to the protracting side of the webbing 302. In order to provide a certain degree of slack to the seatbelt (30 cm for example) such that a passenger may escape even if he/she is wearing the seatbelt, the CPU 201 orders the reverse rotation (seatbelt protracting direction) of the motor to the output interface 205. When the C motor 110 rotates, the CPU 201 detects the rotation quantity y the output of the potential meter 111 and orders the suspension of the DC motor 110 to the output interface 205 when such quantity reaches a prescribed quantity (S138). When a rollover flag has not been set to the flag register (S132; NO), the CPU 201 checks other flags.

According to the seatbelt device of the second embodiment as described above, the slack in the webbing 302 is removed prior to the vehicle collision and the webbing 302 is loosened when the vehicle has drowned, such that the passenger may easily escape. Further, when the vehicle rolls over, the seatbelt is loosened after the rolling and impact of the vehicle due to the rollover have abated, and the passenger's safety and ease of escape from danger is sought.

According to the second embodiment as mentioned above, when an accident is detected, the webbing is loosened after the impact from the accident has abated, and the passenger may easily escape from the vehicle. Moreover, the control mode of loosening the webbing 302 is determined in correspondence with the state of the accident (or the type of accident). For example, if it is a drowning accident or rollover accident, it is advantageous as the webbing is loosened in a separate, appropriate timing.

Although the second embodiment describes examples of drowning and rollover as state of vehicle accidents, it is not limited thereto and may be of other states of vehicle accidents.

As described above, the seatbelt device according to the second embodiment secures the passenger to his/her seat upon removing the slack in the seatbelt prior to the accident and, after the accident, loosens the seatbelt in an appropriate timing in correspondence with the state of the vehicle accident. Thus, it is preferable in that the passenger's safety and ease of escape are ensured.

(Third Embodiment)

The seatbelt device of the present invention according to the third embodiment is now explained with reference to the relevant drawings. The components of the third embodiment which are the same as those in the previous embodiments are given the same reference numerals, and the explanation thereof is omitted.

The difference between the seatbelt device of the third embodiment and the seatbelt devices of the previous embodiments is in the structure of the controller 200C of the retractor 100C.

Similar to the previous embodiments, the DC motor 110 of the retractor 100C in the third embodiment is connected to the controller 200C. The motor drive circuit 206 controls the rotation of the DC motor 110 in accordance with the control signals from the controller 200C.

Figure 28:
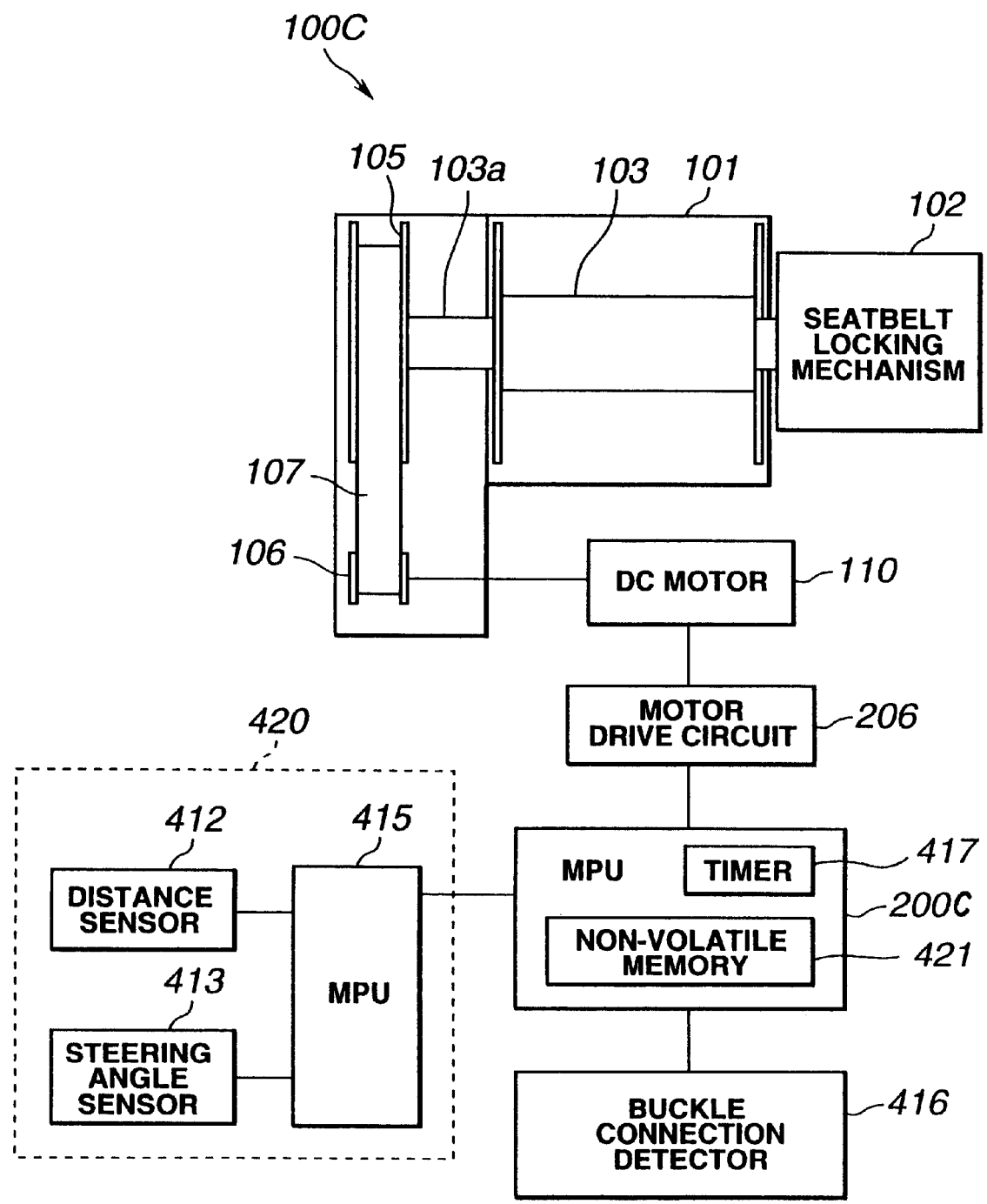
FIG. 28 is a diagram explaining the retractor according to the third embodiment of the present invention.

As shown in FIG. 28, the controller 200C comprises a timer 417 for measuring time and a non-volatile memory 421, and is connected to the buckle connection detector 416 for detecting whether the tongue plate of the seatbelt device is engaged with the buckle and for detecting whether the tongue plate of the seatbelt device has been disengaged from the buckle, and to the controller (MPU) 415 provided to the travelling state detector 420 for detecting the travelling state of the passenger driven vehicle.

The controller 415 is connected respectively to the distance sensor 412 for measuring the distance between a vehicle and the object in front of such vehicle, and a steering angle sensor 413 for detecting the steering angle of the steering wheel.

FIG. 29 is a circuit diagram of the motor drive circuit 206. Terminals P1 and P2 shown in FIG. 29 are input terminals of PWM (Pulse Width Modulation) signals output from the controller 200C and, for example, 20 kHz PWM signals are input thereto. Terminals P3 and P4 are output terminals for the current detector, and terminals P5 and P6 are output terminals for the voltage detector. Terminals P1 through P6 are respectively connected to the controller 200C. Voltage Vb shown in FIG. 29 is supplied to the DC motor 110. The plurality of transistors and FETs etc. shown in FIG. 29 are for driving the DC motor 110 in a normal rotation or reverse rotation by PWM signals from the controller 200C.

Circuit C1 shown in FIG. 29 is a current detection circuit for detecting the current i flowing to the DC motor from the current flowing to the resistance r1, and comprises interface (IF) circuits IF1 and IF2 for removing the fluctuation of the current due to the influence of PWM signals. The controller 200C receives voltage signals respectively from IF1 and IF2, and detects the current i flowing to the DC motor 110 based on such voltage signals.

Circuit C2 is a voltage measurement circuit for measuring the voltage between terminals applied to the DC motor 110 and comprises IF3 and IF4 for removing the fluctuation between the terminals due to the influence of PWM signals. The controller 200 receives voltage signals respectively from IF3 and IF4 and measures the voltage between the terminals applied to the DC motor 110 based on such voltage signals.

IF1 through IF4 are, for example, a low-pass filter structure made from a resistance r2, a resistance r3 having a resistance value smaller than the resistance r2, and a condenser C3, and sets its cutoff frequency to, for example, 20 Hz. Thereby, the influence of PWM signals output to the controller 200C at the current detection circuit C1 and voltage measurement circuit C2 is reduced to −60 dB. Thus, the current to be detected by the current detection circuit C1 and the voltage between the terminals to be measured by the voltage measurement circuit C2 are hardly influenced.

The controller 200C judges whether the webbing 302 has been protracted by the polarity of the voltage between the terminals of the DC motor 110, and judges whether the retraction of the webbing 302 has been completed by the current i flowing to the DC motor 110.

Further, when the protraction of the webbing upon the passenger fastening his/her seatbelt device is detected, the controller 200C performs the following control operations: seatbelt fastening assistance control for controlling the motor such that the webbing 302 can be easily protracted; seatbelt oppression removal control for retracting the webbing 302 after the tongue plate of the webbing is engaged with the buckle and controlling the motor in order to provide a prescribed slack to the passenger after the webbing 302 is fitted to the passenger's body and reaches a retraction limit; movement control for controlling the DC motor 110 in order to ease the protraction of the webbing 302 when the passenger tries to protract the webbing 302 such that he/she may move after fastening such webbing; and housing control for controlling the DC motor 110 in order to house the webbing 302 when the passenger does not fasten the webbing 302 or when the tongue plate is disengaged from the buckle.

The flow of the control signals of the respective constituent parts structuring the seatbelt device of the third embodiment is now explained.

The distance sensor 412 outputs to the controller 415 control signals showing the measurement results of the distance between one's vehicle and the object in front of such vehicle. The controller 415 calculates the safe vehicle interval distance from the formula (1) below and, when the safe vehicle interval distance ds is larger than the value output from the distance sensor 412, outputs to the controller 200C control signals showing a collision danger warning.

After storing to the non-volatile memory 421 the number of times the control signals show this collision danger warning (i.e., frequency of control signals), the controller 200C performs the collision danger warning control for alternately protracting and retracting the webbing 302 in a repetitive manner. Thereby, the passenger will recognize that there is a danger of collision. Furthermore, the controller 415 calculates a collision unavoidable distance dd obtainable from the formula (2) below and, when this collision unavoidable distance dd is larger than the value output from the distance sensor 412, outputs to the controller 200C control signals showing that a collision is unavoidable. At such time, the controller 200C performs collision unavoidable control for changing the retraction power of the webbing 302 in accordance with the value output from the distance sensor 412 and retracting the seatbelt thereafter. The passenger is thereby appropriately protected upon a collision.

$$ds = Vr \times (td + \beta) \tag{1}$$

$$dd = Vr \times td \tag{2}$$

ds: safe vehicle interval distance (unit: m)
dd: collision unavoidable distance (unit: m)
Vr: relative speed (unit: m/s)
td: response delay of driver (e.g., 0.5 to 2 seconds)
β: value determined by braking characteristic of vehicle (e.g., 0.5 to 2 seconds)

The steering angle sensor 413 outputs to the controller 415 control signals corresponding to the steering angle of the steering wheel. When the maximum value of the variation amount of the steering angle within a predetermined time (2 seconds for example) is within a prescribed value (8 degrees for example), the controller 415 judges that there is an indication of the driver driving asleep and outputs to the controller 415 control signals showing a warning thereof. After storing the frequency of sent control signals showing this sleep-driving warning to the non-volatile memory 412, the controller 415 performs sleep driving prevention control for alternately protracting and retracting the seatbelt in a repetitive manner. The driver may thereby recognize that he/she was driving asleep.

The buckle connection detector 416 detects whether the tongue plate of the seatbelt device is engaged with the buckle, and outputs corresponding control signals to the controller 200C. The motor drive circuit 206 controls the rotation of the DC motor 110 based on the control signals from the controller 200C.

Figure 30:
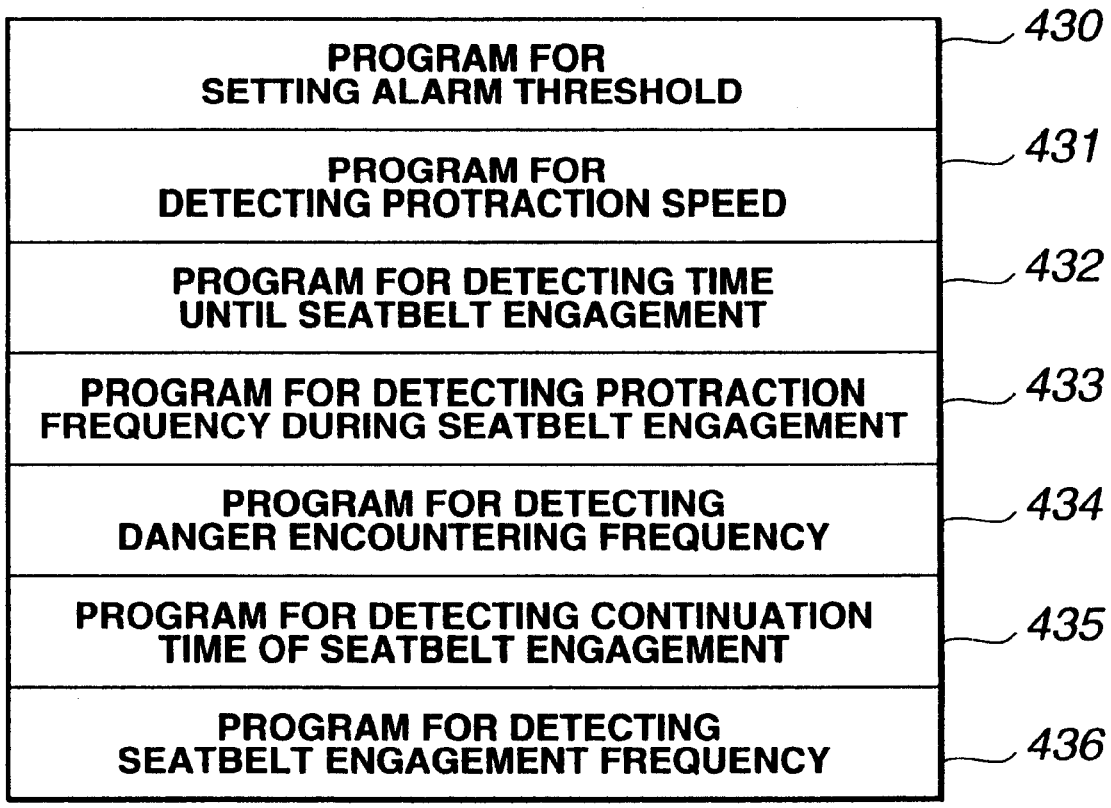
FIG. 30 is a diagram showing an example of a control program executed by the controller according to the third embodiment.

FIG. 30 is a diagram showing an example of control programs executed by the controller 200C. Included in the control programs executed by the controller 200C are: program 430 for setting the alarm threshold, program 431 for detecting the protraction speed, program 432 for detecting the time until seatbelt engagement, program 433 for detecting the frequency of protraction during seatbelt engagement, program 434 for detecting the danger encountering frequency, program 435 for detecting the continuation time of seatbelt engagement, and program 436 for detecting the seatbelt engagement frequency.

The program 430 for setting the alarm threshold is a program for setting the alarm threshold regarding whether to give a warning with the vibration of the seatbelt device which alternately protracts and retracts the webbing 302 in a repetitive manner. It is easier to send the warning with the vibration of the seatbelt device by lowering the alarm threshold, and it will be more difficult to send the warning with the vibration of the seatbelt device by raising the alarm threshold. For example, when a passenger is wearing the seatbelt for a prolonged period of time, the alarm threshold is lowered in order to send, with ease, the warning with the vibration of the seatbelt device as the driver's attentiveness lowers due to fatigue from driving for many hours.

The program 431 for detecting the protraction speed is a program for detecting the protraction speed of the webbing 302 when the passenger fastens the seatbelt device from an unfastened state. Particularly, this program detects the protraction speed of the webbing 302 based on the level of the voltage between the terminals of the DC motor 110.

The program 432 for detecting the time until seatbelt engagement is a program for detecting the time from the moment the protraction stops upon the webbing 302 being protracted when the passenger fastens the seatbelt device from an unfastened state until the time the seatbelt device is fastened. Particularly, the protraction stoppage of the webbing 302 is determined by the voltage between the terminals of the DC motor 110, and the engagement of the seatbelt device is detected by the control signals from the buckle engagement detector 416. This program clocks with the timer 417 the time from the moment the protraction of the webbing 302 stops until the time the seatbelt device is fastened, and performs the detection thereof.

When the protraction speed detected by the program 431 for detecting the protraction speed is fast and when the time until engagement of the seatbelt device detected by the program 432 for detecting the time until seatbelt engagement is short, the controller 200C judges that the driving ability of the passenger is high, and makes the warning difficult by raising the alarm threshold with the program 430 for setting the alarm threshold.

The program 433 for detecting the frequency of protraction during seatbelt engagement is a program for detecting the frequency of the webbing protraction by the passenger during the fastening of the seatbelt device. Specifically, a single protraction is when the webbing 302 is protracted and a stoppage thereof is detected thereafter. This frequency of webbing protraction is calculated during the continuous engagement of the seatbelt, and continued until the seatbelt device becomes an unfastened state. This program detects the continuation time during the engagement of the seatbelt device with the timer 417, detects the protraction frequency by dividing the calculated webbing 302 protraction frequency with this detected continuation time of seatbelt engagement, and stores this frequency to the non-volatile memory 421.

When the protraction frequency detected by the program 433 for detecting the frequency of protraction during seatbelt engagement is high, the controller 200C judges that there is a high possibility of encountering danger, and eases the warning by lowering the alarm threshold with the program 430 for setting the alarm threshold.

The program 434 for detecting the danger encountering frequency is a program for calculating the frequency of danger encountered by the passenger while wearing the seatbelt device, and detecting the danger encountering frequency by dividing such calculated frequency with the continuation time of seatbelt engagement during the engagement of the seatbelt device. Moreover, the frequency of danger encountered by the passenger while wearing the seatbelt device is the aggregate value of the frequency of the control signals showing the collision danger warning is sent and frequency of the control signals showing the sleep-driving warning stored in the non-volatile memory 421. The detected danger encountering frequency is stored in the non-volatile memory 421.

When the danger encountering frequency is high, the controller 200C lessens the amount of slack in the webbing 302 provided during the engagement of the seatbelt device than usual, or increases the tension of the webbing 302 to further secure the passenger. The controller 200C further increases the retraction power of the webbing 302 upon encountering danger, and controls the drive of the DC motor 110 so as to increase the vibration frequency of the seatbelt device with the vibration alarm of the seatbelt device. The control of the drive of the DC motor 110 is conducted with the change in the duty ratio of PWM signals input to the motor drive circuit 206 from the controller 200C.

The program 435 for detecting the continuation time of seatbelt engagement is a program for detecting the continuation time of seatbelt engagement during the engagement of the seatbelt device clocked by the timer 417. In this program, if the time elapsed from the unfastened state of the seatbelt device to the fastened state of the seatbelt device is under a prescribed value, it is possible to clock the time by accumulating the previous continuation time of seatbelt engagement during the engagement of the seatbelt device.

As the passenger's attentiveness lowers due to fatigue from driving for many hours when the continuation time of seatbelt engagement during the engagement of the seatbelt device is prolonged, the controller 200C eases the warning by lowering the alarm threshold with the program 430 for setting the alarm threshold.

The program 436 for detecting the seatbelt engagement frequency is a program for detecting the frequency of the seatbelt device being fastened from an unfastened state based on the control signals output from the buckle connection detector 416. The frequency detected in this program is accumulated and added to the previous frequency and stored in the non-volatile memory 421.

As the webbing 302 becomes difficult to retract due to the deterioration and the like of the webbing as the frequency stored in the non-volatile memory 421 gradually increases, the controller 200C controls the drive of the DC motor 110 in order to increase the retraction power of the webbing 302. The control of the drive of the DC motor 110 is conducted with the change in the duty ratio of PWM signals input to the motor drive circuit 206 from the controller 200C.

According to the third embodiment as mentioned above, based on the results detected respectively from the program 430 for setting the alarm threshold, program 431 for detecting the protraction speed, program 432 for detecting the time until seatbelt engagement, program 433 for detecting the frequency of protraction during seatbelt engagement, program 434 for detecting the danger encountering frequency, program 435 for detecting the continuation time of seatbelt engagement, and program 436 for detecting the seatbelt engagement frequency, the slack in the webbing 302 is reduced than usual, the tension of the webbing 302 is increased, the retraction power of the webbing 302 is increased, the vibration cycle of the seatbelt device during the alarm generated by the vibration of the seatbelt device is shortened, the drive of the DC motor 110 is controlled and the alarm threshold is controlled in order to ease the alarm by lowering the threshold or making the alarm difficult by raising the threshold. Thus, it is possible to provide a comfortable seatbelt-wearing environment and to adequately secure and protect the passenger.

(Fourth Embodiment)

The seatbelt device according to the fourth embodiment of the present invention is now explained with reference to the relevant drawings.

Figure 31:
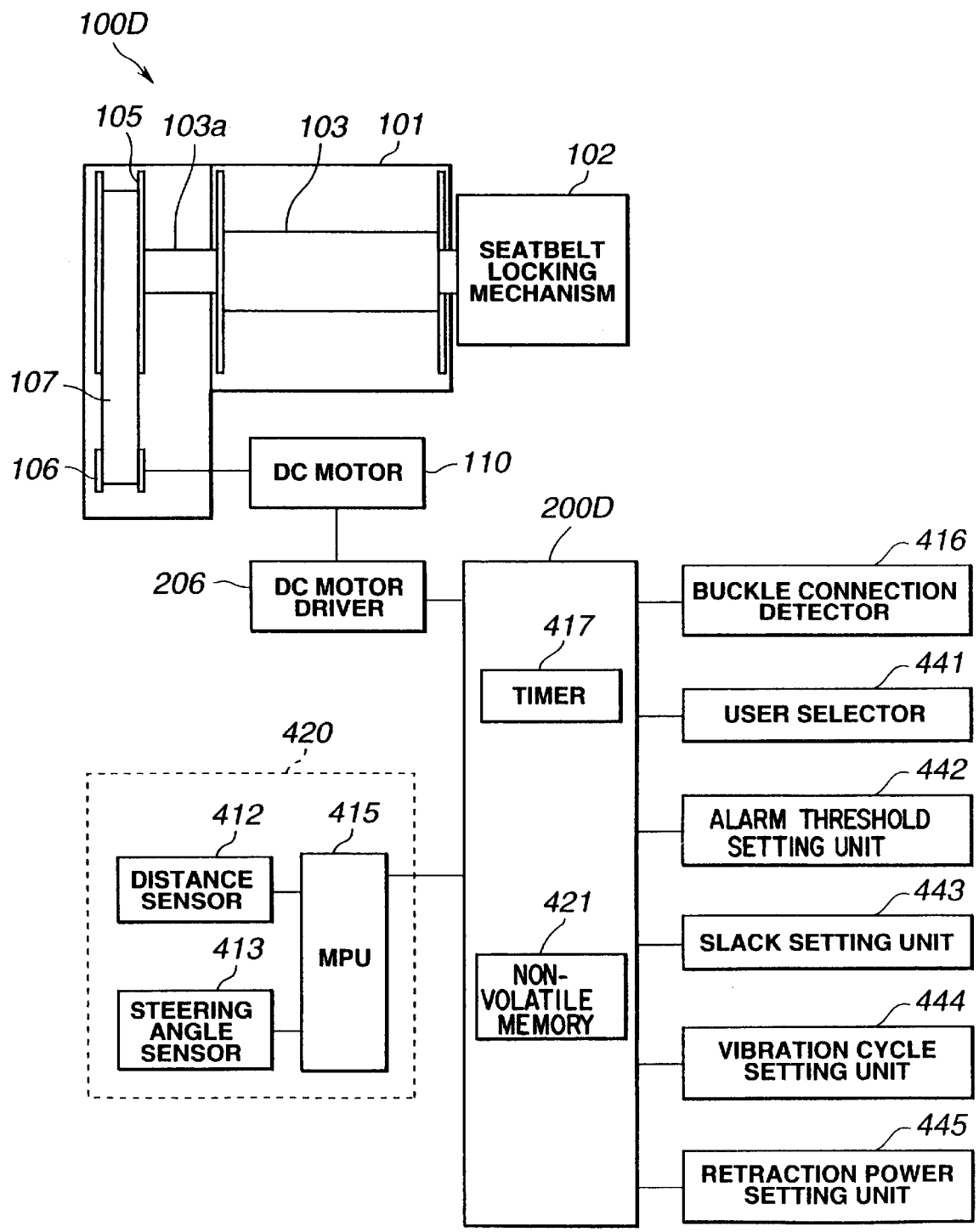
FIG. 31 is a diagram explaining the retractor according to the fourth embodiment of the present invention.

FIG. 31 is a diagram showing the structure of the retractor of the seatbelt device according to the fourth embodiment.

The components of the fourth embodiment which are the same as those in the third embodiment are given the same reference numerals, and the explanation thereof is omitted.

The controller 200D of the retractor of the seatbelt device according to the fourth embodiment, as shown in FIG. 31, connects to the controller 200C of the retractor 100C of the third embodiment the later explained user selector 441, alarm threshold setting unit 442, slack setting unit 443, vibration pattern setting unit 444, and retraction power setting unit 445. Therefore, as the structure of the retractor other than the user selector 441, alarm threshold setting unit 442, slack setting unit 443, vibration pattern setting unit 444, and retraction power setting unit 445 are the same as those in the third embodiment, the explanation thereof is omitted.

The user selector 441 is provided with a user selection switch, and when the passenger selects himself/herself with this user selection switch, the various prescribed values set in advance per passenger are restored in the non-volatile memory 421 as one's own setting values. Various prescribed values are, for example, the alarm threshold, webbing slack, vibration pattern of the seatbelt device during the alarm generated by the vibration of the seatbelt device, and retraction power of the webbing.

The alarm threshold setting unit 442 enables the passenger to freely set the alarm threshold; provided that the alarm threshold is set within a prescribed range.

The slack setting unit 443 enables the passenger to freely set the slack in the webbing 302 after fastening the seatbelt; provided that the slack in the webbing is set within a prescribed range.

The vibration pattern setting unit 444 enables the passenger to freely set the vibration pattern of the seatbelt device by the alarm generated by the vibration of the seatbelt device; provided that there are three selectable vibration patterns, namely, a vibration pattern in which the vibration cycle is accelerated, the vibration is intensified, or the vibration duty is increased (i.e., retraction time per cycle is prolonged).

The retraction power setting unit 445 enables the passenger to freely set the retraction power of the seatbelt; provided that the retraction power of the seatbelt is set within a prescribed range.

According to the fourth embodiment as mentioned above, with the user selector 441, alarm threshold setting unit 442, slack setting unit 443, vibration pattern setting unit 444, and retraction power setting unit 445, it is possible to set one's optimum alarm threshold, webbing slack, vibration pattern of the seatbelt device during the alarm generated by the vibration of the seatbelt device, and retraction power of the webbing. Thus, it is possible to provide a comfortable seatbelt-wearing environment and to appropriately secure and protect the passenger.

What is claimed is:

1. A seatbelt device comprising:

a retractor which uses a motor for retracting and protracting a webbing that secures a passenger to a seat; and a controller for rotating said motor in order to at least retract said webbing;

wherein said retractor comprises:
   a reel to which said webbing is wrapped around;
   a motor for rotating said reel via a power transmitting mechanism;
   a rotation detection element for detecting the rotation of said reel;
   a locking mechanism for locking the rotation of said reel in emergency situations,
   wherein, when said controller does not detect the rotation of said reel after supplying drive signals to said motor, said controller supplies a signal for activating said locking mechanism.

2. A seatbelt device according to claim 1, wherein said locking mechanism includes: a mechanical locking mechanism for mechanically locking the rotation of said reel; and a vehicle acceleration sensor for activating said mechanical locking mechanism.

3. A seatbelt device according to claim 2, further comprising an electromagnetic actuator for compulsorily activating said mechanical locking mechanism responsive to said signal.

4. A seatbelt device according to claim 3, wherein said controller does not activate said locking mechanism when said reel is rotating due to the passenger protracting the webbing.

5. A seatbelt device according to claim 3, wherein said electromagnetic actuator comprises:

a mechanical urging element for providing a mechanical urge to said actuator in order to activate said locking mechanism; and an electromagnetic force generating element for generating electromagnetic force which suppresses said mechanical urge.

6. A seatbelt device according to claim 1, wherein said rotation detection element is a potential meter interlocked with said reel.

* * * * *